(12) United States Patent
Hayashi et al.

(10) Patent No.: US 8,490,756 B2
(45) Date of Patent: Jul. 23, 2013

(54) ELECTRIC PARKING BRAKE APPARATUS HAVING EMERGENCY RELEASE FUNCTION FOR VEHICLE

(75) Inventors: Yasuhito Hayashi, Nagoya (JP); Yusuke Doi, Okazaki (JP); Hiroyuki Kawatsu, Takahama (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 508 days.

(21) Appl. No.: 12/727,911

(22) Filed: Mar. 19, 2010

(65) Prior Publication Data

US 2010/0243386 A1    Sep. 30, 2010

(30) Foreign Application Priority Data

Mar. 31, 2009  (JP) ................................ 2009-085096
Aug. 28, 2009  (JP) ................................ 2009-198375

(51) Int. Cl.
*F16D 65/14*    (2006.01)

(52) U.S. Cl.
USPC ......... 188/2 D; 188/72.1; 188/73.1; 188/156; 188/162; 74/502.6

(58) Field of Classification Search
USPC ............ 188/2 D, 72.1, 72.6–72.8, 73.1, 156, 188/162; 74/473.15, 473.3, 502.4, 502.6, 74/519, 522–527
See application file for complete search history.

(56) References Cited

U.S. PATENT DOCUMENTS

| 7,314,123 B2 * | 1/2008 | Sakashita et al. ......... 188/204 R |
| 7,891,468 B2 * | 2/2011 | Tsubouchi ............... 188/1.11 E |
| 8,104,373 B2 * | 1/2012 | Hayashi et al. ............. 74/502.6 |
| 2006/0016642 A1 * | 1/2006 | Deutloff et al. ............... 188/2 D |

FOREIGN PATENT DOCUMENTS

| JP | 2004324806 A | * | 11/2004 |
| JP | 2008-018898 A | | 1/2008 |
| JP | 2008019973 A | * | 1/2008 |

* cited by examiner

*Primary Examiner* — Pamela Rodriguez
(74) *Attorney, Agent, or Firm* — Buchanan Ingersoll & Rooney PC

(57) ABSTRACT

An electric parking brake apparatus having an emergency releasing function for a vehicle, includes an actuator having a driven member, and an emergency release mechanism releasing a parking brake without relying on an electric motor and including an emergency driving member, and an operation mechanism, which is provided between an operation portion provided at the vehicle interior and the actuator and drives the emergency driving member, wherein the operation mechanism includes an operation driving member, which is movable relative to the emergency driving member so as to be engageable with and disengageable from the emergency driving member and drives the emergency driving member in a case where the operation driving member is engaged with the emergency driving member, and a positioning mechanism, which normally maintains an disengaged state of the emergency driving member and is provided at an end portion of the operation mechanism positioned closer to the actuator.

9 Claims, 22 Drawing Sheets

FIG. 4
FIG. 5
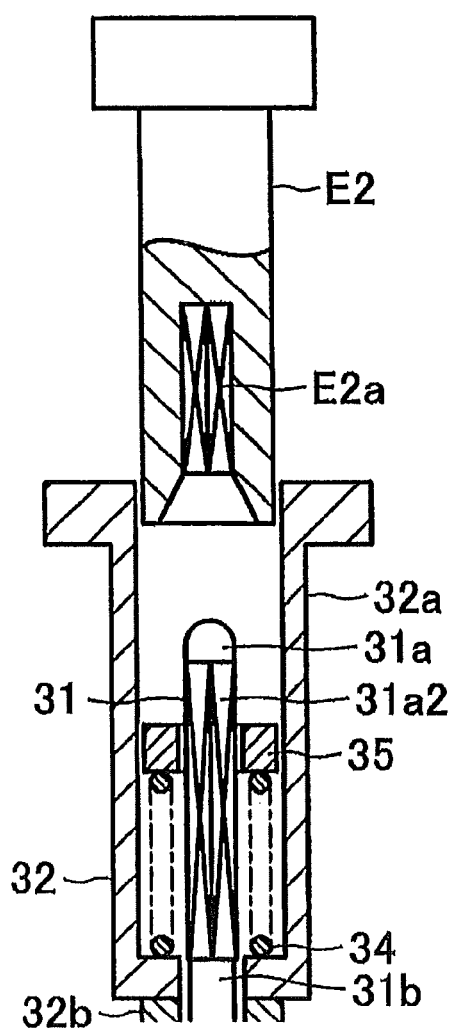
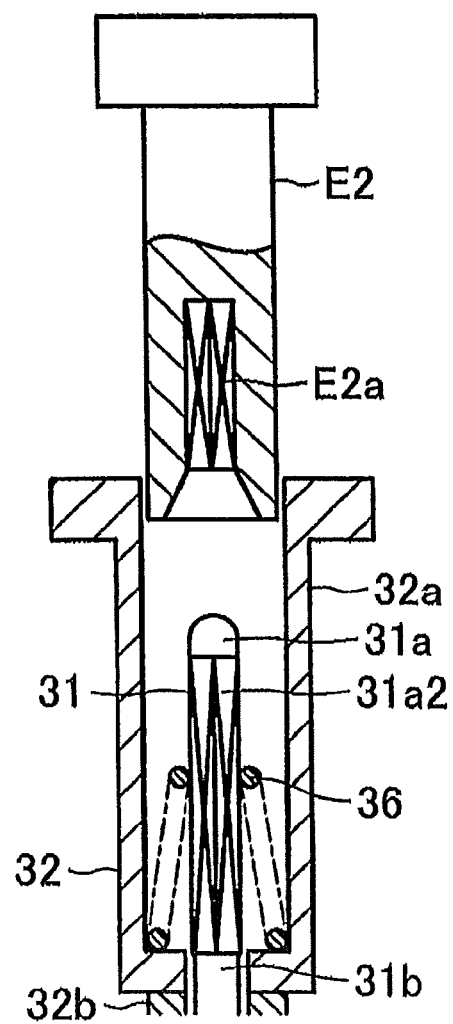

FIG. 6
FIG. 7
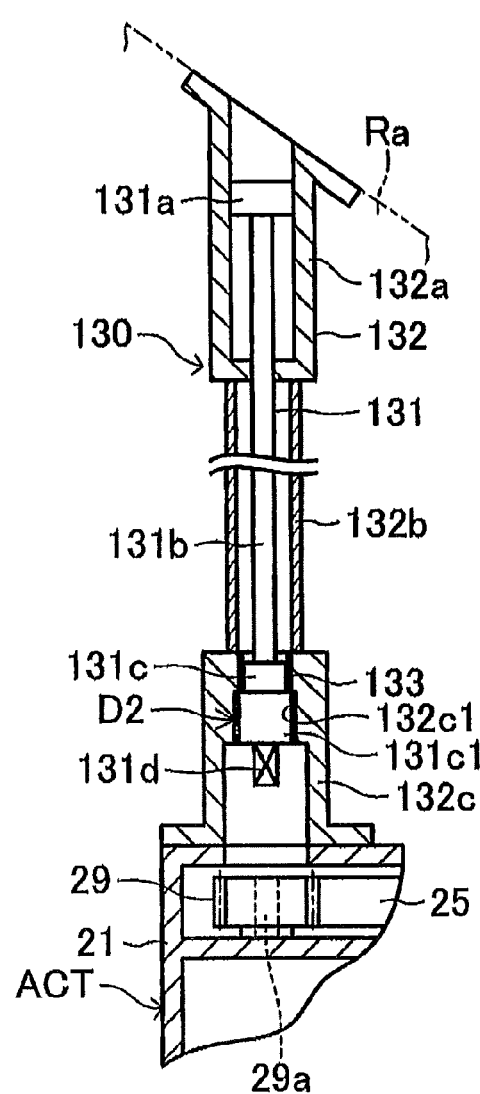
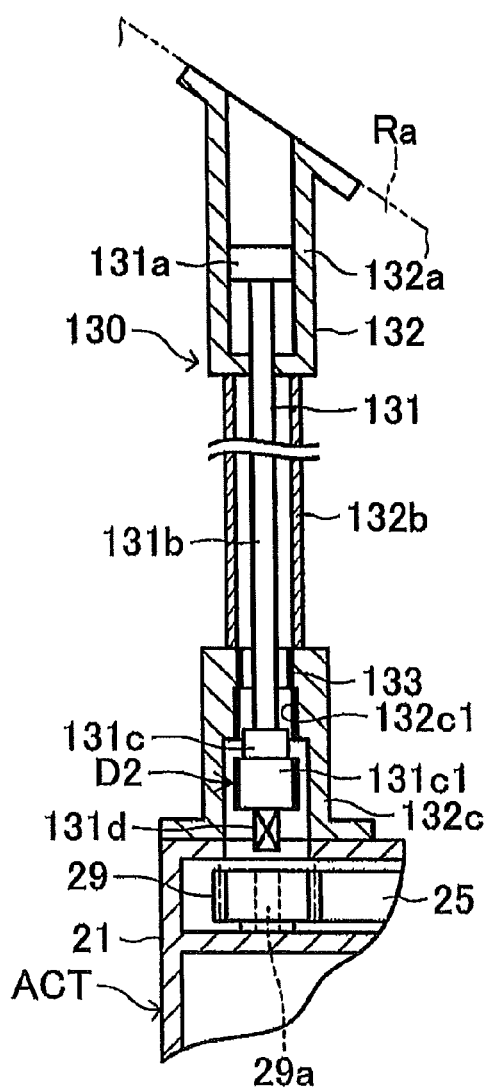

FIG. 8
FIG. 9
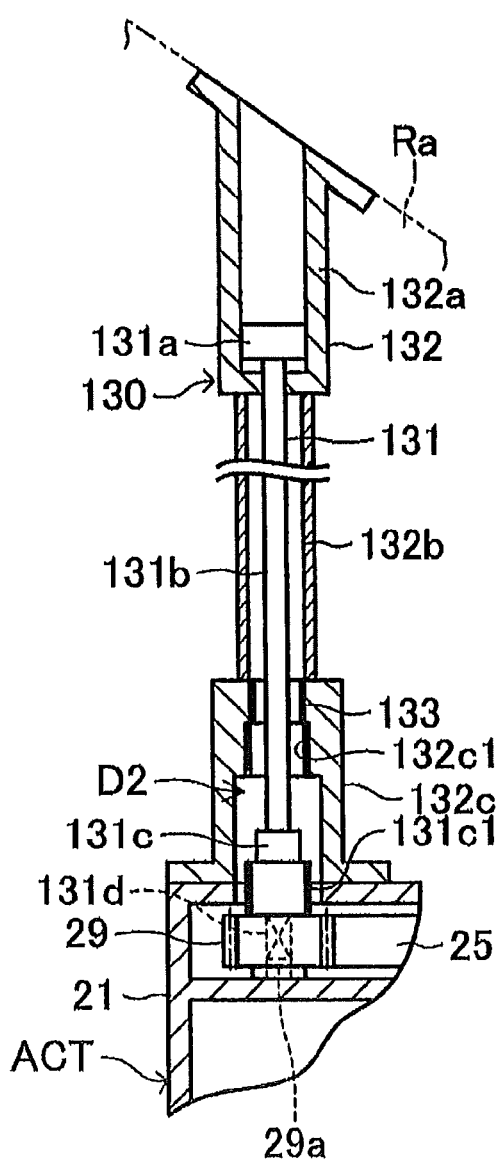
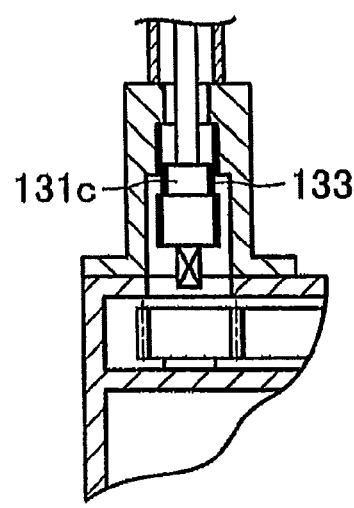

F I G. 16
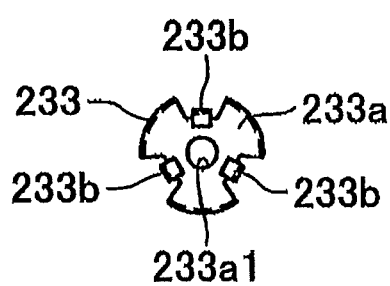
F I G. 17
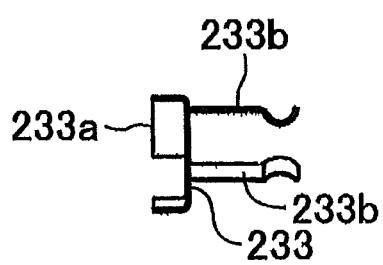
F I G. 18
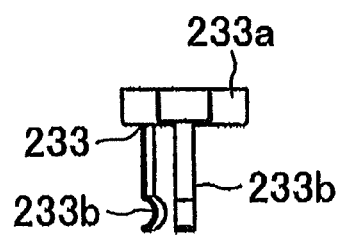

ELECTRIC PARKING BRAKE APPARATUS HAVING EMERGENCY RELEASE FUNCTION FOR VEHICLE

CROSS REFERENCE TO RELATED APPLICATIONS

This application is based on and claims priority under 35 U.S.C. §119 to Japanese Patent Application 2009-085096, filed on Mar. 31, 2009, and Japanese Patent Application 2009-198375, filed on Aug. 28, 2009, the entire content of which are incorporated herein by reference.

FIELD OF THE INVENTION

The present invention generally relates to an electric parking brake apparatus having an emergency release function for a vehicle.

BACKGROUND

Disclosed in JP2008-18898A is an electric parking brake apparatus having an emergency release function for a vehicle (which will be hereinafter referred to as an electric parking brake apparatus) that includes an actuator and an emergency release mechanism. The actuator includes a driven member (an output gear), which is configured so as to control a parking brake to be in an actuated state (i.e. a braked state, a locked state), where the parking brake is actuated, and in a released state (i.e. a lock released state), where the parking brake is not actuated, in response to a driving of an electric motor. The emergency release mechanism is configured so as to be operated from a vehicle interior. More specifically, the emergency release mechanism is configured so as to release the parking brake without relying on the driving of the electric motor in a case of emergency. Furthermore, the emergency release mechanism includes an emergency driving member (an emergency release gear) and an operation mechanism. The emergency driven member, which is provided within the actuator, is configured so as to drive the driven member (the output gear). The operation mechanism is provided between an operation portion, which is provided within the vehicle interior, and the actuator and is configured so as to drive the emergency driving member (the emergency release gear).

According to the electric parking brake apparatus disclosed in JP2008-18898A, the emergency release mechanism further includes a driving force transmitting member (a rotation transmitting member), which is configured to be manually operated from the vehicle interior, so that the driven member (the output gear) provided within the actuator is driven by means of the driving force transmitting member (the rotation transmitting member) in order to release (unlock) the electric parking brake apparatus.

The driving force transmitting member of the emergency release mechanism of the electric parking brake apparatus disclosed in JP2008-18898A includes a rotating shaft, a hexagon socket head and an emergency output gear. The rotating shaft is configured so as to be manually and rotatably operated by means of a tool from the vehicle interior and is configured to be curvable. The hexagon socket head is fixed at an input end portion of the rotating shaft (i.e. an end portion of the rotating shaft positioned closer to the vehicle interior) and is configured so that the tool is attached to and detached from the hexagon socket head. The emergency output gear is fixed at an output end portion of the rotating shaft (i.e. an end portion of the rotating shaft positioned closer to the actuator) and normally engages with the driven member (the output gear). According to the driving force transmitting member of the emergency release mechanism disclosed in JP2008-18898A, the hexagon socket head and the rotating shaft may be driven in addition to the emergency output gear in a case where the driven member (the output gear) of the actuator is driven by the electric motor in a normal use. As a result, an operating noise may be generated, which may cause a discomfort to a driver.

Illustrated in FIG. 52 is another example of an electric parking brake apparatus having an emergency release function for a vehicle, which may be conceivable on the basis of the electric parking brake apparatus disclosed in JP2008-18898A. As illustrated in FIG. 52, the electric parking brake apparatus includes an operation mechanism 4, which is disposed between an operation portion 1 provided at a vehicle interior and an actuator 2 and which is configured so as to drive an emergency driving gear 3 (an emergency release gear). More specifically, the operation mechanism 4 includes an operation driving member 4a (a cable-type driving shaft), an outer tube 4b and a positioning spring 4c. The operation driving member 4a is configured so as to be movable (advance and withdraw) relative to the emergency driving member 3 and so as to be engaged with and disengaged from the emergency driving member 3 (i.e. so that a torque is transmittable and not transmittable). More specifically, the operation driving member 4a is configured so as to drive the emergency driving member 3 in a case where the operation driving member 4a is engaged with the emergency driving member 3 (in a case where the torque is transmittable is established). The outer tube 4b accommodates therein the operation driving member 4a. The positioning spring 4c normally retains the operation driving member 4a to be disengaged from the emergency driving member 3 (i.e. in a state where the torque is not transmittable). Accordingly to an emergency release mechanism of the electric parking brake apparatus illustrated in FIG. 52, the operation driving member 4a of the operation mechanism 4 is not driven in a case where a driven member 5 (an output gear), which is provided within the actuator 2, is driven by an electric motor 6 in the normal use. As a result, an operation noise may be reduced.

However, according to the operation mechanism 4 illustrated in FIG. 52, a stroke necessary for moving a gear connecting portion 4a1 of the operation driving member 4a from a withdrawal position illustrated in FIG. 52 to an engaged position where the gear connecting portion 4a1 is engaged with a shaft bore 3a of the emergency driving member 3 so that the torque is transmittable may largely differ depending on variations of length of the operation driving member 4a, variations of length of the outer tube 4b, variations of arrangement of the operation driving member 4a and the outer tube 4b to the vehicle, and the like. As a result, an engagement amount (a connecting amount) of the gear connecting portion 4a1 relative to the emergency driving member 3 may become insufficient, or the gear connecting portion 4a1 may not be engaged with the emergency driving member 3.

A need thus exists to provide an electric parking brake apparatus having an emergency release function for a vehicle, which is not susceptible to the drawback mentioned above.

SUMMARY OF THE INVENTION

According to an aspect of the present invention, an electric parking brake apparatus having an emergency releasing function for a vehicle, includes an actuator having a driven member for controlling a parking brake to be in an actuated state and a released state in response to a driving of an electric motor, and an emergency release mechanism being operable from a vehicle interior, controlling the parking brake to be released without relying on the driving of the electric motor, and including an emergency driving member, which is provided within the actuator and which drives the driven member, and an operation mechanism, which is provided between an operation portion provided at the vehicle interior and the actuator and which drives the emergency driving member, wherein the operation mechanism includes an operation driving member, which is movable towards and away from the emergency driving member so that the operation driving member is engaged with and disengaged from the emergency driving member and which drives the emergency driving member in a case where the operation driving member is engaged with the emergency driving member, and a positioning mechanism, which retains the operation driving member to be disengaged form the emergency driving member in a normal situation, and the positioning mechanism is provided at an end portion of the operation mechanism positioned closer to the actuator.

BRIEF DESCRIPTION OF THE DRAWINGS

The foregoing and additional features and characteristics of the present invention will become more apparent from the following detailed description considered with the reference to the accompanying drawings, wherein:

FIG. 4 is a side view illustrating an end portion of an operation mechanism positioned closer to an operation portion and a tool according to a first modified example of the first embodiment;

FIG. 5 is a side view illustrating an end portion of an operation mechanism positioned closer to an operation portion and a tool according to a second modified example of the first embodiment;

FIG. 6 is a diagram schematically illustrating a principal portion of an electric parking brake apparatus according to a second embodiment;

FIG. 7 is a diagram for explaining a process of inserting an inner cable of an operation mechanism towards an actuator according to the second embodiment;

FIG. 8 is a diagram for explaining a state where the inner cable of the operation mechanism according to the second embodiment is inserted towards the actuator by a predetermined amount;

FIG. 9 is a diagram partially illustrating a modified example of the operation mechanism illustrated in FIG. 6;

FIG. 16 is a front view illustrating a single plate spring illustrated in FIGS. 13 and 14;

FIG. 17 is a side view of the single plate spring illustrated in FIG. 16;

FIG. 18 is a plane view illustrating the single plate spring illustrated in FIG. 16;

DETAILED DESCRIPTION

First Embodiment

Figure 1:
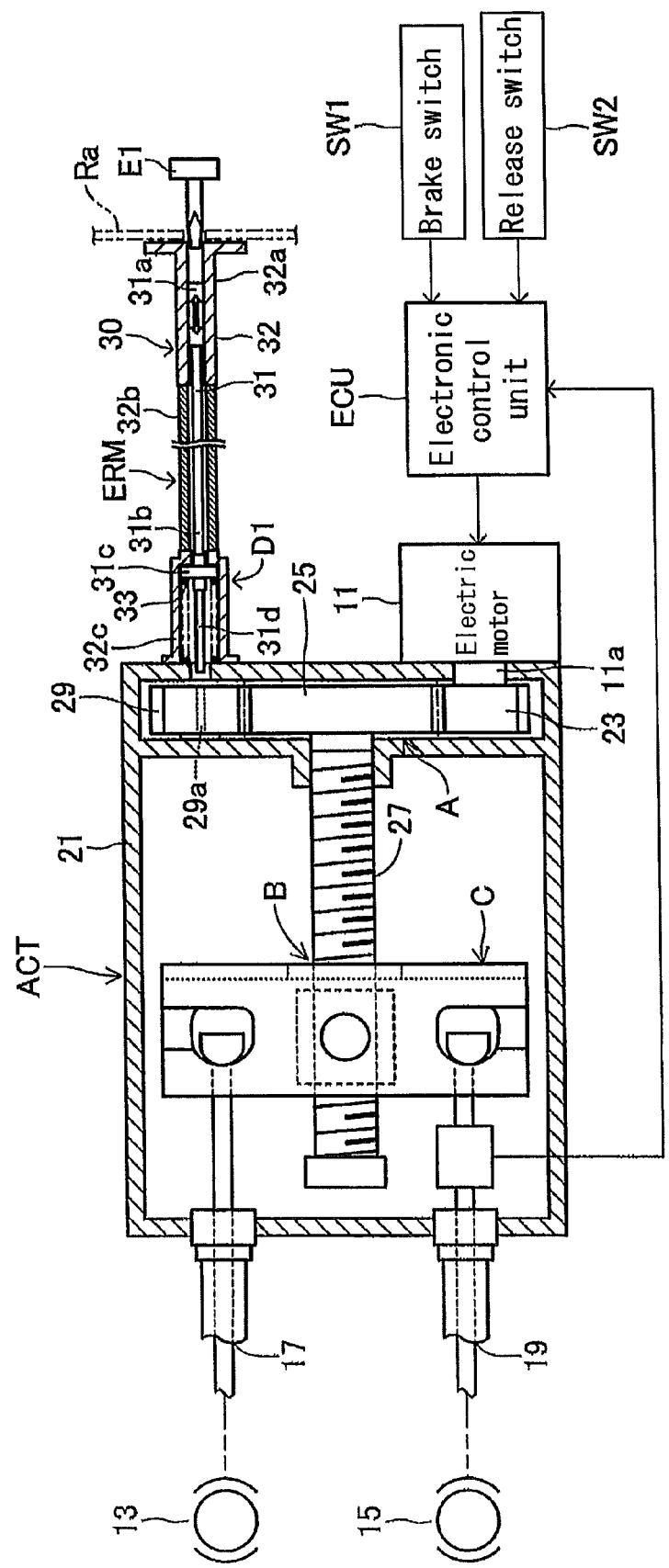
FIG. 1 is a diagram schematically illustrating an entire configuration of an electric parking brake apparatus according to a first embodiment.

A first embodiment of an electric parking brake apparatus having an emergency release function for a vehicle (which will be hereinafter referred to as an electric parking brake apparatus) will be described below with reference to the attached drawings. Illustrated in FIG. 1 is a schematic diagram of the electric parking brake apparatus according to the first embodiment. As illustrated in FIG. 1, the electric parking brake apparatus includes an actuator ACT and an emergency release mechanism ERM. The actuator ACT is configured so as to control first and second parking brakes 13 and 15 to be in an actuated state (i.e. a state where the parking brakes 13 and 15 are actuated, a braked state, a locked state) or a released state (i.e. a state where the parking brakes 13 and 15 are not actuated, a lock released state) in response to a driving of an electric motor 11. Furthermore, the actuator ACT includes a speed reduction mechanism A, a conversion mechanism B, a distribution mechanism C, a pair of cables 17 and 19 (first and second cables 17 and 19) and an electronic control unit ECU. The speed reduction mechanism A reduces a speed of a rotational driving force, which is generated by the electric motor 11 as an output, and transmits the reduced rotational driving force to the conversion mechanism B. The conversion mechanism B converts the rotational driving force of the electric motor 11 transmitted to the conversion mechanism B via the speed reduction mechanism A into a linear driving force. The distribution mechanism C is actuated by the linear driving force, which is generated by the conversion mechanism B, and distributes the linear driving force to two output portions of the distribution mechanism C. The first and second cables 17 and 19 are connected to the respective output portions of the distribution mechanism C, so that the linear driving force is transmitted to the first and second parking brakes 13 and 15. The electronic control unit ECU controls positive and negative rotations of the electric motor 11 (i.e. the rotation of the electric motor 11 in one direction (a positive direction) and in the other direction (a negative direction) opposite to the one direction).

The electric motor 11 is assembled to a housing 21 having a sealed structure (in FIG. 1, a cover is removed from the housing 21) together with the speed reduction mechanism A. Furthermore, as illustrated in FIG. 1, the electric motor 11 is electrically connected to the electronic control unit ECU, so that the electronic control unit ECU controls an actuation of the electric motor 11. More specifically, when a driver operates a brake switch SW1, the electric motor 11 is rotated in the positive direction. On the other hand, in a case where the driver operates a release switch SW2, the electric motor 11 is rotated in the negative direction (i.e. a direction reverse to the positive direction). Additionally, the housing 21 is provided at, for example, an upper surface of a frame, which supports a rear wheel, below a trunk provided at a rear portion of the vehicle.

As illustrated in FIG. 1, the speed reduction mechanism A is configured with a speed reduction gear train having an input gear 23 and an output gear 25. The output gear 25 serves as a driven member. Additionally, any desired number of the speed reduction gear train may be provided at the speed reduction mechanism A. The housing 21 accommodates therein the input gear 23 and the output gear 25 while allowing the input gear 23 and the output gear 25 to rotate. The input gear 23 is fixed at an output shaft 11a of the electric motor 11, so that the input gear 23 is rotated together with the output shaft 11a as a unit. The output gear 25 is fixed at an end portion of a screw shaft 27 of the conversion mechanism B, so that the output gear 25 is rotated together with the screw shaft 27 as a unit.

The conversion mechanism B and the distribution mechanism C have similar configurations as a conversion mechanism and a distribution mechanism of the electric parking brake apparatus disclosed in JP2008-18898A. Accordingly, the detailed explanation of the conversion mechanism A and the distribution mechanism C will be omitted. Furthermore, a configuration of the electric parking brake apparatus from the distribution mechanism C to the first and second parking brakes 13 and 15, and a configuration of the electronic control unit ECU are similar to a configuration of the electric parking brake apparatus from the distribution mechanism and first and second parking brakes 13 and 15 and a configuration of an electronic control unit EUC disclosed in JP2008-18898A.

Accordingly, detailed explanation of the configuration of the electric parking brake apparatus from the distribution mechanism C to the first and second parking brakes 13 and 15 and the configuration of the electronic control unit ECU will be omitted.

The emergency release mechanism ERM is configured so as to release the first and second parking brakes 13 and 15 in the actuated state (i.e. the braked state) without relying on the driving of the electric motor 11 in a case of an emergency. More specifically, the emergency release mechanism ERM includes an emergency release gear 29 and an operation mechanism 30. The emergency release gear 29, which serves as an emergency driving member, is configured so as to rotatably drive the output gear 25, which serves as the driven gear and which is provided within the actuator ACT. The operation mechanism 30 is configured so as to rotatably drive the emergency release gear 29. The operation mechanism 30 is disposed between an operation portion Ra, which is provided at a trunk room (at a vehicle interior), and the actuator ACT. Furthermore, the operation mechanism 30 includes an inner cable 31 (an operation driving member), which is configured so as to rotatably drive the emergency release gear 29 and which serves as an operation driving member, and an outer casing 32 for accommodating therein the inner cable 31 and a spring 33.

The inner cable 31 includes a first cable end 31a positioned closer to the operation portion Ra, a cable main body 31b, a second cable end 31c positioned closer to the actuator ACT and a driving shaft 31d. The first cable end 31a and the second cable end 31c are integrally connected within the outer casing 32 by means of the cable main body 31b, which is formed to be flexible. The driving shaft 31d is integrally connected to the second cable end 31c positioned closer to the actuator ACT. Furthermore, the driving shaft 31d of the inner cable is configured so as to be movable towards and away from (i.e. advance and withdraw relative to) the emergency release gear 29, and so as to be engaged with and disengaged from the emergency release gear 29. In a case where the driving shaft 31d is in an engaged state, where the driving shaft 31d is engaged with a shaft bore 29a of the emergency release gear 29 so that a torque is transmittable therebetween, the emergency release gear 29 is rotatably driven via the driving shaft 31d. Additionally, a cross-sectional shape of the driving shaft 31d is formed to have the same shape as the cross-sectional shape of the shaft bore 29a. For example, the cross-sectional shapes of the driving shaft 31d and the shaft bores 29a are formed in a non-circular shape, such as a hexangle, a quadrangle and the like.

The outer casing 32 includes a first casing cap 32a positioned closer to the operation portion Ra, a casing main body 32b (a flexible tube) and a second casing cap 32c positioned closer to the actuator ACT. The first casing cap 32a and the second casing cap 32c are integrally connected by means of the casing main body 32b, which is formed to be flexible. The first casing cap 32a of the outer casing 32 is fixed at the operation portion Ra, which is provided at the trunk room. On the other hand, the second casing cap 32c is fixed at the housing 21 of the actuator ACT. Additionally, a protection cap is provided at an end portion of the first casing cap 32a positioned closer to the trunk room while allowing the protection cap to be attached to and detached from the end portion of the first casing cap 32a.

The first cable end 31a positioned closer to the operation portion Ra is assembled to the first casing cap 32a positioned closer to the operation portion Ra so as to be movable in a right-and-left direction in FIG. 1 (i.e. so as to move towards and move away from the first casing cap 32a) and so as to be rotatable relative to the first casing cap 32a. An I-shaped groove 31a1 (see FIG. 3) is formed at an end portion of the first cable end 31a (i.e. an end portion of the first cable end 31a positioned at the right in FIG. 1, and at the upper side in FIGS. 2 and 3), so that an end portion of a tool E1 is engageable relative to the first cable end 31a via the I-shaped groove 31a1. Accordingly, the inner cable 31 is manually rotatably operated by means of the tool E1 from the operation portion Ra, which is provided at the trunk room.

The second cable end 31c positioned closer to the actuator ACT is accommodated within the second casing cap 32c positioned closer to the actuator ACT together with the spring 33. Furthermore, the second cable end 31c is configured so as to be movable (so as to advance and withdraw) relative to the second casing cap 32c by a predetermined amount. For example, the second cable end 31c is configured so as to be movable to the left by the predetermined amount from a state illustrated in FIG. 1. The second cable end 31c positioned closer to the actuator ACT, the second casing cap 32c positioned closer to the actuator ACT, the spring 33 and the like configure a positioning mechanism D1. As illustrated in FIG. 1, the positioning mechanism D1 is provided at an end portion of the operation mechanism 30 positioned closer to the actuator ACT. The positioning mechanism D1 normally retains the driving shaft 31d to be disengaged from the shaft bore 29a of the emergency release gear 29.

According to the electric parking brake apparatus of the first embodiment, the operation mechanism 30 includes the inner cable 31, which is configured so as to rotatably drive the emergency release gear 29, and the positioning mechanism D1, which retains the driving shaft 31d of the inner cable 31 to be disengaged from the shaft bore 29a of the emergency release gear 29 in a normal situation. The positioning mechanism D1 is provided at the end portion of the operation mechanism 30 positioned closer to the actuator ACT.

Accordingly, strokes necessary for moving the driving shaft 31d of the inner cable 31 from a withdrawal position (i.e. a position of the driving shaft 31d illustrated in FIG. 1) to an engaged position (i.e. a position where the driving shaft 31d is engaged with the shaft bore 29a of the emergency release gear 29 by a predetermined amount) may be properly set (controlled) even if a length of the inner cable 31 does not coincide with a length of the outer casing 32 or even if arrangement of the inner cable 31 and the outer casing 32 to the vehicle varies (i.e. generally, a final length of the inner cable 31 and a final length of the outer casing 32 after being arranged to the vehicle may differ depending on how the inner cables 31 and the outer casing 32 are arranged on the vehicle even if the inner cable 31 and the outer casing 32 are formed to have the same length because both of the inner cable 31 and the outer casing 32 (i.e. the cable main body 31b and the casing main body 32b) are formed to be flexible). Accordingly, in this embodiment, an engagement amount (i.e. a fittingly connected amount) of the driving shaft 31d of the inner cable 31 relative to the emergency release gear 29 may be sufficiently ensured even if the length of the inner cable 31 does not coincide with the length of the outer casing 32 or even if the arrangement of the inner cable 31 and the outer casing 32 to the vehicle varies (i.e. without being influenced by a manufacturing error of a component, an assembling error or difference of the components and the like).

In this embodiment, the emergency release gear 29 may be rotatably operated in a manner where: firstly, the end portion of the tool E1 is inserted into the first casing cap 32a in order to engage the end portion of the tool E1 with the I-shaped groove 31a1 of the inner cable 31; secondly, the tool E1 is pushed inwardly towards the actuator ACT by a predetermined amount while resisting against a biasing force of the spring 33 in order to engage the driving shaft 31d of the inner cable 31 with the shaft bore 29a of the emergency release gear 29 by a predetermined amount; and then, the tool E1 is rotated. Accordingly, in the case of the emergency, performing the above-described operation may allow the first and second parking brakes 13 and 15 to be released without relying on the driving of the electric motor 11.

Figure 2:
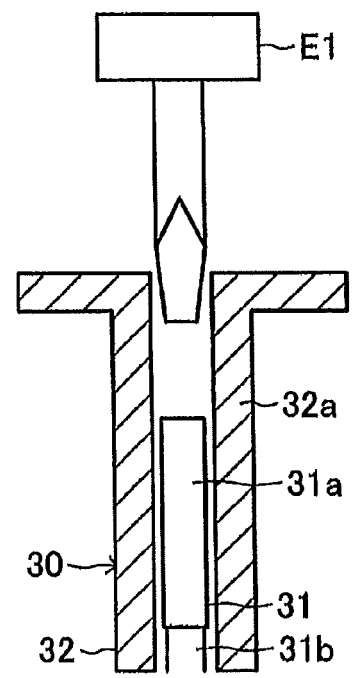
FIG. 2 is an enlarged diagram illustrating an end portion of an operation mechanism positioned closer to an operation portion and a tool illustrated in FIG. 1.
Figure 3A:
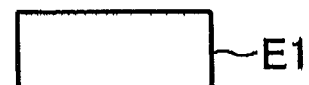
FIG. 3 is a side view illustrating a cable end positioned closer to the operation portion and the tool illustrated in FIG. 2.
Figure 3B:
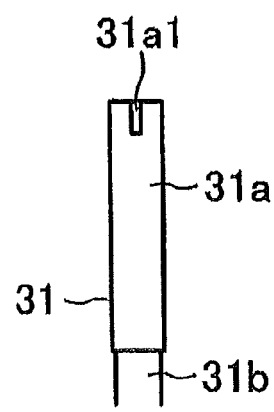

In the first embodiment, the I-shaped groove 31a1 is formed at the first cable end 31a of the inner cable 31 positioned closer to the operation portion Ra, and the tool E1 is adapted (see FIGS. 1 to 3). However, as illustrated in FIG. 4 of a first modified example of the first embodiment and FIG. 5 of a second modified example of the first embodiment, the electric parking brake apparatus may be modified so that an engagement portion 31a2, whose cross-sectional shape is formed in a quadrangle, is formed at the first cable end 31a of the inner cable 31 positioned closer to the operation portion Ra. Furthermore, in this case, a tool E2 (i.e. a tool having an engagement bore E2a formed so as to correspond to a shape of the engagement portion 31a2, so that the torque is transmittable between the tool E2 and the inner cable 31 when the tool E2 is engaged with the first cable end 31a) may be adapted, instead of the tool E1 of the first embodiment.

In the first modified example of the first embodiment, the first cable end 31a positioned closer to the operation portion Ra is coaxially supported by the first casing cap 32a positioned closer to the operation portion Ra by means of a coil spring 34 formed in a cylindrical shape and an annular plate 35, which are accommodated within the first casing cap 32a, in order to avoid the tool E2 from not being engaged with the engagement portion 31a2 of the first cable end 31a because of an eccentricity (decentering) of the inner cable 31 (see FIG. 4). Furthermore, in the second modified example of the first embodiment, the first cable end 31a positioned closer to the operation portion Ra is coaxially supported by the first casing cap 32a positioned closer to the operation portion Ra by means of a coil spring 36, which is formed in a frustoconical shape and which is accommodated within the first casing cap 32a, in order to avoid the tool E2 from not being engaged with the engagement portion 31a2 of the first cable end 31a because of the eccentricity (decentering) of the inner cable 31 (see FIG. 5).

In the first embodiment, the operation mechanism 30 of the emergency release mechanism ERM includes the inner cable 31, the outer casing 32 and the spring 33. However, the electric parking brake apparatus may be modified so as to include an operation mechanism 130 (a second embodiment, see FIGS. 6 to 8), an operation mechanism 230 (a third embodiment, see FIGS. 13 to 20), an operation mechanism 330 (a fourth embodiment, see FIGS. 21 to 35) or an operation mechanism 430 (a fifth embodiment, see FIGS. 36 to 51), instead of the operation mechanism 30 of the first embodiment.

Second Embodiment

The operation mechanism 130 of the second embodiment (see FIGS. 6, 7 and 8) is provided between the operation portion Ra, which is provided at the trunk room (at the vehicle interior), and the actuator ACT. Furthermore, the operation mechanism 130 includes an inner cable 131 (an operation driving member) and an outer casing 132. The inner cable 131 is configured so as to rotatably drive the emergency release gear 29. The outer casing 132 accommodates therein the inner cable 131 and a sealing sleeve 133.

The inner cable 131 includes a first cable end 131a positioned closer to the operation portion Ra, a cable main body 131b, a second cable end 131c positioned closer to the actuator ACT and a driving shaft 131d. The first cable end 131a positioned closer to the operation portion Ra is integrally connected to the second cable end 131c positioned closer to the actuator ACT within the outer casing 132 by means of the cable main body 131b, which is formed to be flexible. The driving shaft 131d is integrally connected to the second cable end 131c positioned closer to the actuator ACT. The inner cable 131 is configured so that the driving shaft 131d is movable (so as to advance and withdraw) relative to the emergency release gear 29 and so as to be engaged with and disengaged from the emergency release gear 29. For example, in a case where an engagement state where the driving shaft 131d is engaged with the shaft bore 29a of the emergency release gear 29 so that the torque is transmittable therebetween is established, the emergency release gear 29 is rotatably driven via the driving shaft 131d. Additionally, a cross-sectional shape of the driving shaft 131d and a cross-sectional shape of the shaft bore 29a are formed in quadrangles.

The outer casing 132 includes a first casing cap 132a positioned closer to the operation portion Ra, a casing main body 132b (a flexible tube) and a second casing cap 132c positioned closer to the actuator ACT. The first casing cap 132a and the second casing cap 132c are integrally connected by means of the casing main body 132b, which is formed to be flexible. The first casing cap 132a of the outer casing 132 is fixed at the operation portion Ra, which is provided at the trunk room. On the other hand, the second casing cap 132c is fixed at the housing 21 of the actuator ACT. Additionally, a protection cap is provided at an end portion of the first casing cap 132a positioned within the trunk room while allowing the protection cap to be attached to and detached from the end portion of the first casing cap 132a.

The first cable end 131a positioned closer to the operation portion Ra is assembled to the first casing cap 132a positioned closer to the operation portion Ra so as to be movable in an up-and-down direction in FIG. 6 (so as to advance and withdraw) and so as to be rotatable relative to the first casing cap 132a. A hexagon socket is formed at an end portion of the first cable end 131a positioned closer to the operation portion Ra, so that an end portion of a tool is engageable relative to the first cable end 131a via the hexagon socket. Accordingly, the inner cable 131 may be manually rotatably operated by means of the tool from the operation portion Ra, which is provided at the trunk room.

The second cable end 131c positioned closer to the actuator ACT is accommodated within the second casing cap 132c positioned closer to the actuator ACT together with the sealing sleeve 133, so that the second cable end 131c is movable (advances and withdraws) relative to the second casing cap 132c by a predetermined amount. The second cable end 131c positioned closer to the actuator ACT and the second casing cap 132c positioned closer to the actuator ACT configure a positioning mechanism D2. As illustrated in FIG. 6, the positioning mechanism D2 is provided at an end portion of the operation mechanism 130 positioned closer to the actuator ACT. The positioning mechanism D2 normally retains the driving shaft 131d of the inner cable 131 to be disengaged from the shaft bore 29a of the emergency release gear 29.

The positioning mechanism D2 includes an external thread 131c1 and an internal thread 132c1. The internal thread 132c1 is formed at the second casing cap 132c (a holder) positioned closer to the actuator ACT. The external thread 131c1 is integrally formed at the second cable end 131c positioned closer to the actuator ACT. Furthermore, the external thread 131c1 is formed so as to be threadedly engaged with the internal thread 132c1 by a predetermined amount. In the case where the driving shaft 131d of the inner cable 131 is disengaged from the shaft bore 29a of the emergency release gear 29, the external thread 131c1 and the inner thread 132c1 are threadedly engaged (see FIG. 6). On the other hand, in a case where the driving shaft 131d of the inner cable 131 is engaged with the shaft bore 29a of the emergency release gear 29, the external thread 131c1 is disengaged from the internal thread 132c1 (see FIG. 8).

Accordingly, even in the second embodiment, where the electric parking brake apparatus includes the operation mechanism 130, an engagement amount of the driving shaft 131d of the inner cable 131 relative to the emergency release gear 29 may be sufficiently ensured even if a length of the inner cable 131 does not coincide with a length of the outer casing 132 or even if arrangement of the inner cable 131 and the outer casing 132 to the vehicle varies, as is the case with the first embodiment. Furthermore, according to the electric parking brake apparatus having the operation mechanism 130, the driving shaft 131d of the inner cable 131 may be engaged with the shaft bore 29a of the emergency release gear 29 in the case of the emergency in a manner where the inner cable 131 is pushed towards the actuator ACT while the inner cable 131 is rotated in response to an operation from the vehicle interior and the external thread 131c1 is disengaged from the internal thread 132c1 (see FIGS. 7 and 8). When the inner cable 131 is further rotated in order to rotate the emergency release gear 29 while the above-described state is established, the first and second parking brakes 13 and 15 may be released without relying on the driving of the electric motor 11.

According to the second embodiment where the electric parking brake apparatus includes the operation mechanism 130, because a spring member (i.e. a spring member corresponding to the spring 33 of the first embodiment) does not need to be provided at the positioning mechanism D2, a number of components used for the electric parking brake apparatus may be reduced, which may further result in reducing manufacturing costs of the electric parking brake apparatus. Furthermore, in this case, an operation of pushing the tool towards the actuator ACT while resisting against the biasing force of the spring is not needed in the case of the emergency. Accordingly, the electric parking brake apparatus according to the second embodiment may have a greater operability in the case of the emergency.

According to the second embodiment, the sealing sleeve 133 is fixed at the second casing cap 132c positioned closer to the actuator ACT, so that the sealing sleeve 133 normally functions (i.e. so that the sealing sleeve 133 avoids an unnecessary rotation of the inner cable 131 while an emergency release of the parking brakes 13 and 15 is not performed). However, as illustrated in FIG. 9, the electric parking brake apparatus of the second embodiment may be modified so that the sealing sleeve 133 is fixed at the second cable end 131c positioned closer to the actuator ACT. In this case, the sealing sleeve 133 may function, more specifically, the sealing sleeve 133 guides (supports) a movement of the inner cable 131, even at an early stage of an emergent release operation (i.e. a state illustrated in FIG. 9).

Figure 10A:
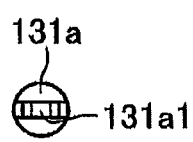
FIG. 10A is a diagram schematically illustrating a first modified example of the inner cable when being viewed from above in an axial direction thereof.
Figure 10B:
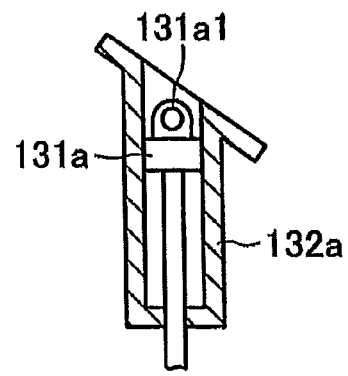
FIG. 10B is a diagram schematically illustrating the first modified example of the inner cable illustrated in FIG. 6.
Figure 11A:
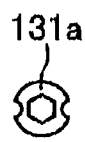
FIG. 11A is a diagram schematically illustrating a second modified example of the inner cable when being viewed from above in the axial direction thereof.
Figure 11B:
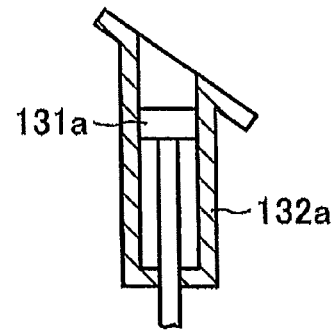
FIG. 11B is a diagram schematically illustrating the second modified example of the inner cable illustrated in FIG. 6.
Figure 12A:
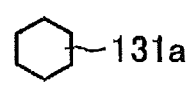
FIG. 12A is a diagram schematically illustrating a third modified example of the inner cable when being viewed from above in the axial direction thereof.
Figure 12B:
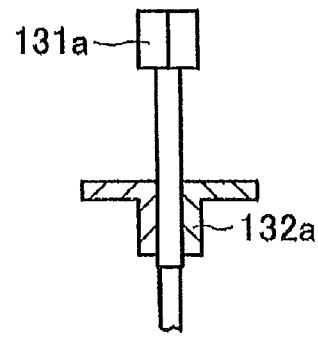
FIG. 12B is a diagram schematically illustrating the third modified example of the inner cable illustrated in FIG. 6.

Additionally, a shape of the first cable end 131a positioned closer to the operation portion Ra may be modified as illustrated in FIGS. 10 and 11. Furthermore, shapes of the first cable end 131a positioned closer to the operation portion Ra and the first casing cap 132a positioned closer to the operation portion Ra may be modified as illustrated in FIG. 12. According to a first modified example of the second embodiment, as illustrated in FIG. 10, a protrusion 131a1 is integrally formed at the first cable end 131a positioned closer to the operation portion Ra. Accordingly, the inner cable 131 is moved (pushed) and rotated by means of a tool used for an emergency case via the protrusion 131a1. Furthermore, a through hole is formed at the protrusion 131a1, so that the inner cable 131 is pulled by the tool (a pulling tool) via the through hole. According to a second modified example of the second embodiment, as illustrated in FIG. 11, a hexagonal socket is formed at the first cable end 131a positioned closer to the operation portion Ra, so that the inner cable 131 is moved (pushed) and rotated by means of a tool used for the emergency via the hexagonal socket. Furthermore, a pair of cut-outs are formed at the first cable end 131a positioned closer to the operation portion Ra, so that the inner cable 131 is pulled by the tool (a pulling tool) via the cut-outs. According to a third modified example of the second embodiment, as illustrated in FIG. 12, a hexagonal head is formed at the first cable end 131a positioned closer to the operation portion Ra, so that the inner cable 131 is moved (pushed) and rotated by means of a tool used for the emergency or so that the inner cable 131 is manually pulled. Furthermore, the first casing cap 132a positioned closer to the operation portion Ra is formed so that the hexagonal head protrudes outwardly from the first casing cap 132a.

Third Embodiment

The operation mechanism 230 of the third embodiment (see FIGS. 13 through 20) is provided between the operation portion Ra provided at the trunk room (i.e. at the vehicle interior) and the actuator ACT. Furthermore, the operation mechanism 230 includes an inner cable 231 (an operation driving member) and an outer casing 232. The inner cable 231 is configured so as to rotatably drive the emergency release gear 29, which is indicated by an imaginary line (a chain double-dashed line) in FIG. 20. The outer casing 232 accommodates therein the inner cable 231 and a plate spring 233.

The inner cable 231 includes a first cable end 231a positioned closer to the operation portion Ra, a cable main body 231b, a second cable end 231c positioned closer to the actuator ACT and a driving shaft 231d. The first cable end 231a positioned closer to the operation portion Ra is integrally connected to the second cable end 231c positioned closer to the actuator ACT within the outer casing 232 by mean of the cable main body 231b, which is formed to be flexible. The driving shaft 231d is integrally connected to the second cable end 231c positioned closer to the actuator ACT. The inner cable 231 is configured so that the driving shaft 231d is movable (so as to advance and withdraw) relative to the emergency release gear 29 and so as to be engaged with and disengaged from the emergency release gear 29. For example, in a case where an engagement state where the driving shaft 231d is engaged with the shaft bore 29a of the emergency release gear 29 so that the torque is transmittable therebetween is established (i.e. a state illustrated in FIG. 20), the emergency release gear 29 is rotatably driven via the driving shaft 231d. Additionally, a cross-sectional shape of the driving shaft 231d and the cross-sectional shape of the shaft bore 29a are formed in hexangles (see FIG. 14).

The outer casing 232 includes a first casing cap 232a positioned closer to the operation portion Ra, a casing main body 232b (a flexible tube) and a second casing cap 232c positioned closer to the actuator ACT. The first casing cap 232a and the second casing cap 232c are integrally connected by means of the casing main body 232b, which is formed to be flexible. The first casing cap 232a of the outer casing 232 is fixed at the operation portion Ra, which is provided at the trunk room. On the other hand, the second casing cap 232c is fixed at the housing 21 of the actuator ACT via a seal ring 234.

Figure 13:
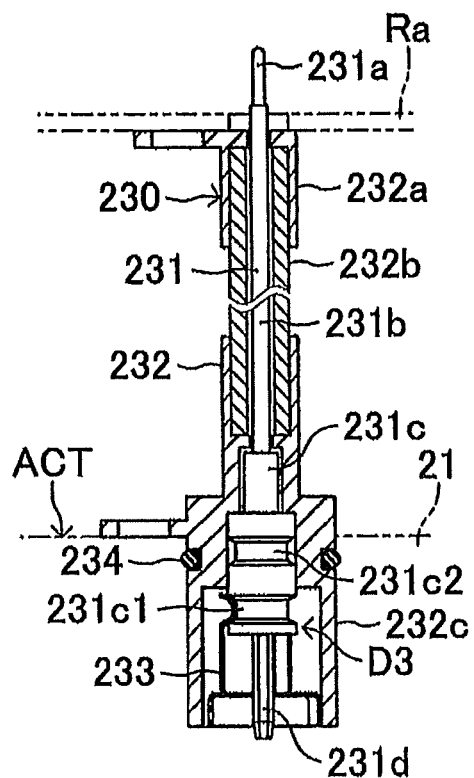
FIG. 13 is a diagram illustrating a principal portion of an electric parking brake apparatus according to a third embodiment.
Figure 14:
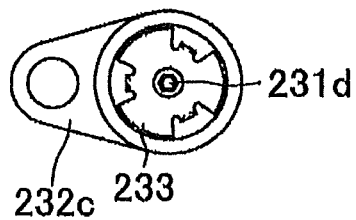
FIG. 14 is a diagram illustrating a configuration of an end portion of an operation mechanism positioned closer to an actuator according to the third embodiment.
Figure 15:
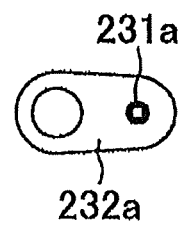
FIG. 15 is a diagram illustrating a configuration of an end portion of the operation mechanism positioned closer to an operation portion according to the third embodiment.
Figure 19:
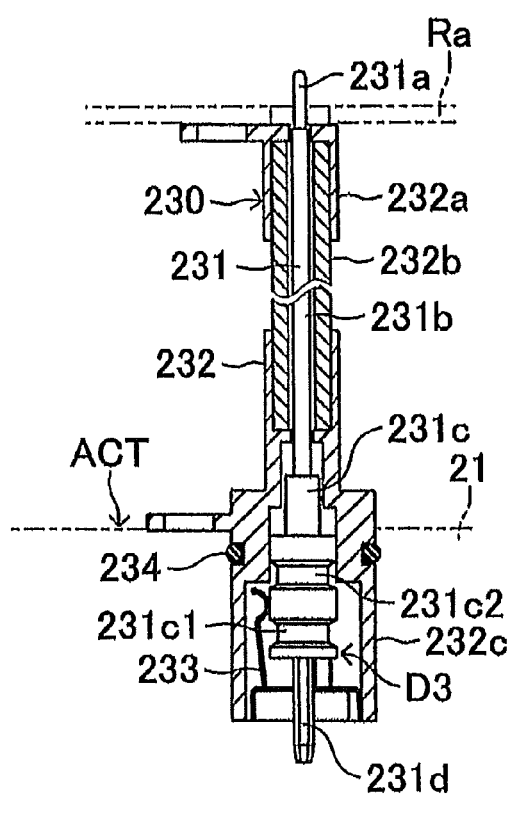
FIG. 19 is a diagram for explaining a process of inserting an inner cable of the operation mechanism according to the third embodiment towards the actuator.
Figure 20:
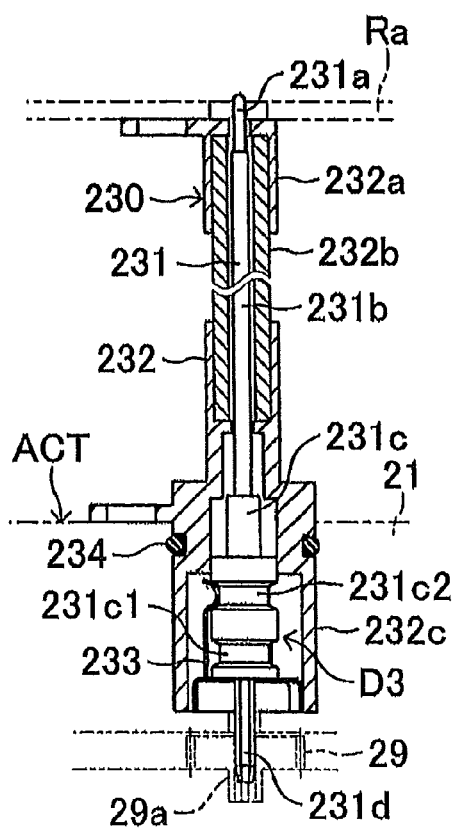
FIG. 20 is a diagram illustrating a state where the inner cable of the operation mechanism according to the third embodiment is inserted towards the actuator by a predetermined amount.

The first cable end 231a positioned closer to the operation portion Ra is assembled to the first casing cap 232a positioned closer to the operation portion Ra so as to be movable in an up-and-down direction in FIG. 13 (so as to advance and withdraw) and so as to be rotatable relative to the first casing cap 232a. An end portion of the first cable end 231a (i.e. an upper end portion of the first cable end 231a in FIG. 13) positioned closer to the operation portion Ra is formed so that a cross-sectional shape of the first cable end 231a is formed in a quadrangle (see FIG. 15) in order to enable a tool to be engaged with the first cable end 231a. Accordingly, the inner cable 231 may be manually rotatably operated by using the tool from the operation portion Ra, which is provided at the trunk room.

The second cable end 231c positioned closer to the actuator ACT is accommodated within the second casing cap 232c positioned closer to the actuator ACT together with the plate spring 233. Furthermore, the second cable end 231c is configured so as to be movable (so as to advance and withdraw) relative to the second casing cap 232c by a predetermined amount. The second cable end 231c positioned closer to the actuator ACT, the second casing cap 232c positioned closer to the actuator ACT, the plate spring 233 and the like configure a positioning mechanism D3. As illustrated in FIG. 13, the positioning mechanism D3 is provided at an end portion of the operation mechanism 230 positioned closer to the actuator ACT. The positioning mechanism D3 normally retains the driving shaft 231d of the inner cable 231 to be disengaged from the shaft bore 29a of the emergency release gear 29.

The positioning mechanism D3 includes the plate spring 233, a first engagement portion 231c1 and a second engagement portion 231c2. The plate spring 233 is provided within the second casing cap 232c (a holder) positioned closer to the actuator ACT. The first engagement portion 231c1 and the second engagement portion 231c2 are integrally formed at the second cable end 231c positioned closer to the actuator ACT. Furthermore, the first and second engagement portions 231c1 and 231c2 are formed on the second cable end 231c so as to be away from each other by a predetermined distance in an advance-and-withdraw direction (i.e. an axial direction of the inner cable 231) while the first and second engagement portions 231c1 and 231c2 are formed to be engageable with and disengageable from the plate spring 233. For example, in the case where the driving shaft 231d of the inner cable 231 is disengaged from the shaft bore 29a of the emergency release gear 29, the plate spring 233 snappingly (elastically, firmly) engages with the first engagement portion 231c1 (see FIG. 13). On the other hand, in the case where the driving shaft 231d of the inner cable 231 is engaged with the shaft bore 29a of the emergency release gear 29, the plate spring 233 snappingly engages with the second engagement portion 231c2 while allowing the inner cable 231 to rotate. As illustrated in FIGS. 16 to 18, the plate spring 233 includes an attachment portion 233a engaged with the second casing cap 232c positioned closer to the actuator ACT, an arm portion 233b (in this embodiment, three arm portions 233b are provided), which snappingly engages with the first engagement portion 231c1 or the second engagement portion 231c2, and a through hole 233a1, which is formed at a center portion of the attachment portion 233a and through which the driving shaft 231d of the inner cable 231 is inserted.

Accordingly, even in the third embodiment, where the electric parking brake apparatus includes the operation mechanism 230, an engagement amount of the driving shaft 231d of the inner cable 231 relative to the emergency release gear 29 may be sufficiently ensured even if a length of the inner cable 231 does not coincide with a length of the outer casing 232 or even if arrangement of the inner cable 231 and the outer casing 232 to the vehicle varies, as is the case with the first embodiment. Furthermore, according to the electric parking brake apparatus having the operation mechanism 230, the driving shaft 231d of the inner cable 231 may be engaged with the shaft bore 29a of the emergency release gear 29 in the case of the emergency in a manner where the inner cable 231, which is in a state illustrated in FIG. 13, is pushed towards the actuator ACT in response to an operation from the vehicle interior so as to be in a state illustrated in FIG. 20 via a state illustrated in FIG. 19. When the inner cable 231 is rotated in order to rotate the emergency release gear 29 while the driving shaft 231d of the inner cable 231 is engaged with the shaft bore 29a of the emergency release gear 29, the first and second parking brakes 13 and 15 may be released without relying on the driving of the electric motor 11

According to the third embodiment where the electric parking brake apparatus includes the operation mechanism 230, the plate spring 233 normally snappingly engages with the first engagement portion 231c1, as illustrated in FIG. 13. Therefore, the state where the driving shaft 231d of the inner cable 231 is being disengaged from the shaft bore 29a of the emergency release gear 29 is appropriately and surely ensured in the normal situation. Furthermore, in the case of the emergency, because the plate spring 233 snappingly engages with the second engagement portion 231c2 (see FIG. 20), the state where the driving shaft 231d of the inner cable 231 is being engaged with the shaft bore 29a of the emergency release gear 29 is appropriately and surely ensured. Accordingly, the electric parking brake apparatus according to the third embodiment may have a greater operability in the case of the emergency.

According to the third embodiment, the first and second engagement portions 231c1 and 231c2 are integrally formed at the second cable end 231c positioned closer to the actuator ACT. However, the electric parking brake apparatus according to the third embodiment may be modified so that only the first engagement portion 231c1 is formed at the second cable end 231c. In this case, because the plate spring 233 normally snappingly engages with the engagement portion 231c1, the driving shaft 231d of the inner cable 231 is surely and appropriately disengaged from the shaft bore 29a of the emergency release gear 29. Additionally, in this case, a shape of the second cable end 231c positioned closer to the actuator ACT may be modified so that the arm portions 233b of the plate spring 233 do not engage with the second cable end 231c when the inner cable 231 is pushed towards the actuator ACT. In this case, an operation of pushing a tool towards the actuator ACT while resisting against a biasing force of a spring is not needed. Accordingly, the electric parking brake apparatus according to the third embodiment may have a greater operability in the case of the emergency.

Fourth Embodiment

The operation mechanism 330 of the fourth embodiment (see FIGS. 21 to 35) is disposed between the operation portion Ra, which is provided at the trunk room (i.e. the vehicle interior), and the actuator ACT. The operation mechanism 330 includes an inner cable 331 (an operation driving member) and an outer casing 332. The inner cable 331 is configured so as to rotatably drive the emergency release gear 29. The outer casing 332 accommodates therein the inner cable 331, a spring 333, a movement controlling plate 334 (a movement controlling member) and a disengagement preventing clip 335.

Figure 25:
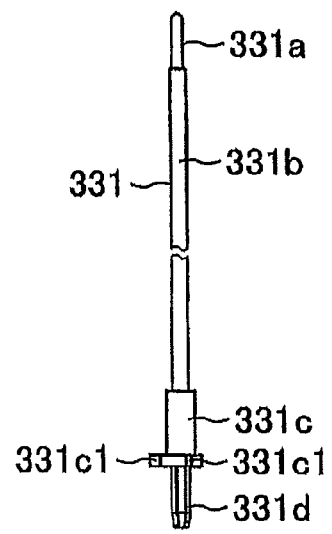
FIG. 25 is a side view illustrating a single inner cable of the operation mechanism according to the fourth embodiment.
Figure 26:
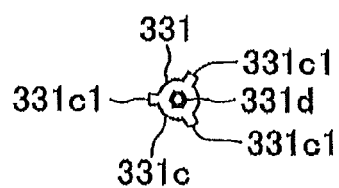
FIG. 26 is a diagram illustrating a configuration of an end portion of the single inner cable positioned closer to the actuator.
Figure 27:
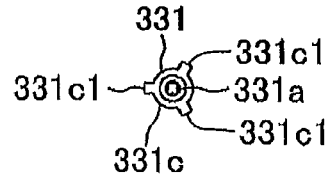
FIG. 27 is a diagram illustrating an end portion of the single inner cable positioned closer to an operation portion according to the fourth embodiment.

As illustrated in FIGS. 25 to 27, the inner cable 331 includes a first cable end 331a positioned closer to the operation portion Ra, a cable main body 331b, a second cable 331c positioned closer to the actuator ACT and a driving shaft 331d. The first cable end 331a positioned closer to the operation portion Ra is integrally connected to the second cable end 331c positioned closer to the actuator ACT within the outer casing 332 by mean of the cable main body 331b, which is formed to be flexible. The driving shaft 331d is integrally connected to the second cable end 331c positioned closer to the actuator ACT. The inner cable 331 is configured so that the driving shaft 331d is movable (so as to advance and withdraw) relative to the emergency release gear 29 and so as to be engaged with and disengaged from the emergency release gear 29. For example, in a case where an engagement state where the driving shaft 331d is engaged with the shaft bore 29a of the emergency release gear 29 (see e.g. FIG. 29) so that the torque is transmittable therebetween is established (i.e. a state illustrated in FIG. 32), the emergency release gear 29 may be rotatably driven via the driving shaft 331d. Additionally, a cross-sectional shape of the driving shaft 331d and a cross-sectional shape of the shaft bore 29a are formed in hexangles.

Figure 23:
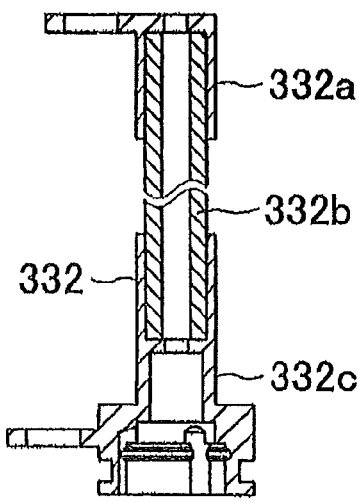
FIG. 23 is a cross-sectional diagram illustrating a single outer casing of the operation mechanism according to the fourth embodiment.
Figure 24:
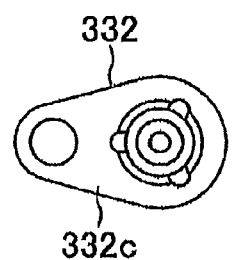
FIG. 24 is a diagram illustrating a configuration of an end portion of the single outer casing positioned closer to the actuator according to the fourth embodiment.

As illustrated in FIGS. 23 and 24, the outer casing 332 includes a first casing cap 332a positioned closer to the operation portion Ra, a casing main body 332b (a tube) and a second casing cap 332c positioned closer to the actuator ACT. The first casing cap 332a and the second casing cap 332c are integrally connected by means of the casing main body 332b, which is formed to be flexible. The first casing cap 332a of the outer casing 332 is fixed at the operation portion Ra, which is provided at the trunk room. On the other hand, the second casing cap 332c is fixed at the housing 21 of the actuator ACT via a seal ring 336.

Figure 21:
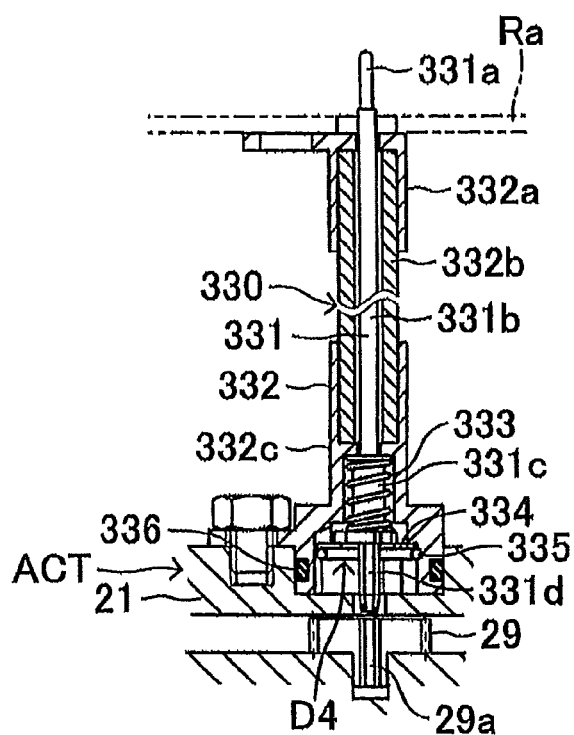
FIG. 21 is a diagram schematically illustrating a principal portion of an electric parking brake apparatus according to a fourth embodiment.

The first cable end 331a positioned closer to the operation portion Ra is assembled to the first casing cap 332a positioned closer to the operation portion Ra so as to be movable in an up-and-down direction in FIG. 21 (so as to advance and withdraw) and so as to be rotatable relative to the first casing cap 332a. An end portion of the first cable end 331a (i.e. an upper end portion of the first cable end 331a in FIG. 21) positioned closer to the operation portion Ra is formed so that a cross-sectional shape of the first cable end 331a is formed in a quadrangle (see FIG. 27) in order to allow a tool to be engaged with the first cable end 331a. Accordingly, the inner cable 331 is manually rotatably operated by using the tool from the operation portion Ra, which is provided at the trunk room.

The second cable end 331c positioned closer to the actuator ACT is accommodated within the second casing cap 332c positioned closer to the actuator ACT together with the movement controlling plate 334 and the disengagement preventing clip 335. Furthermore, the second cable end 331c is configured so as to be movable (so as to advance and withdraw) relative to the second casing cap 332c by a predetermined amount. The second cable end 331c positioned closer to the actuator ACT, the spring 333, the movement controlling plate 334 and the like configure a positioning mechanism D4. As illustrated in FIG. 21, the positioning mechanism D4 is provided at an end portion of the operation mechanism 330 positioned closer to the actuator ACT. The positioning mechanism D4 normally retains the driving shaft 331d of the inner cable 331 to be disengaged from the shaft bore 29a of the emergency release gear 29.

Figure 28:
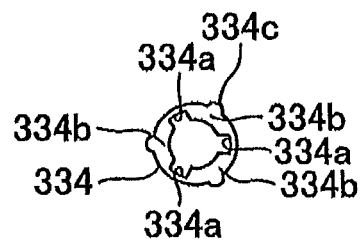
FIG. 28 is a front view of a single movement controlling plate illustrated in FIG. 25.
Figure 29:
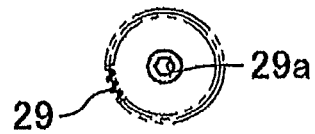
FIG. 29 is a front view illustrating a single emergency release gear illustrated in FIG. 21.

The positioning mechanism D4 includes a protrusion 331c1 (see FIGS. 25 to 27) and the movement controlling plate 334 (see FIG. 28). In this embodiment, the positioning mechanism D4 includes three of the protrusion 331c1. The protrusions 331c1 are integrally provided at the second cable end 331c positioned at the actuator ACT so as to outwardly protrude in a radial direction of the second cable end 331c. The movement controlling plate 334, which is provided within the second casing cap (the holder) 332c positioned closer to the actuator ACT, includes an allowing portion 334a (in this embodiment, three allowing portions 334a are provided) and a restricting portion 334b (in this embodiment, three restricting portions 334b are provided). The allowing portions 334a allow the respective protrusions 331c1 to pass through the movement controlling plate 334 via the allowing portions 334a. On the other hand, the restricting portions 334b do not allow the respective protrusions 331c1 to pass through the movement controlling plate 334. Furthermore, the allowing portions 334a are arranged so as to keep a predetermined distance between the neighboring allowing portions 334a in a circumferential direction of the movement controlling plate 334 (i.e. so as to form 60 degrees in angle between the neighboring allowing portions 334a). Similarly, the restricting portions 334b are arranged so as to keep a predetermined distance between the neighboring restricting portions 334b in the circumferential direction (i.e. so as to form 60 degrees in angle between the neighboring restricting portions 334b). Additionally, a protrusion 334c (in this embodiment, three protrusions 334c are provided) is formed at an outer circumferential portion of the movement controlling plate 334. The protrusions 334c of the movement controlling plate 334 are fitted into respective attachment holes formed at the second casing cap 332c positioned closer to the actuator ACT, so that the movement controlling plate 334 is not allowed to rotate relative to the second casing cap 332c.

Figure 22:
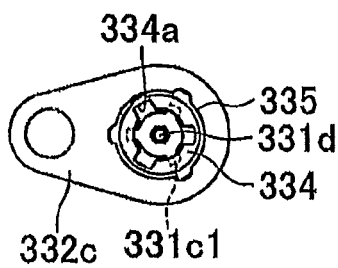
FIG. 22 is a diagram illustrating a configuration example of an end portion of an operation mechanism positioned closer to an actuator according to the fourth embodiment.

According to the positioning mechanism D4 having the above-described configuration, the driving shaft 331d of the inner cable 331 is disengaged from the shaft bore 29a of the emergency release gear 29 in a case where the protrusions 331c1 are not allowed to pass through the movement controlling plate 334 by means of the restricting portions 334b (i.e. a state illustrated in FIGS. 21 and 22). On the other hand, in a case where the protrusions 331c1 are allowed to pass through the movement controlling plate 334 via the allowing portions 334a (i.e. a state illustrated in FIGS. 30 to 33), the driving shaft 331d of the inner cable 331 becomes engageable relative to the shaft bore 29a of the emergency release gear 29. Furthermore, the positioning mechanism D4 includes the spring 333 between the protrusions 331c1 of the second cable end 331c positioned closer to the actuator ACT and the second casing cap 332c positioned closer to the actuator ACT, so that the spring 333 biases the protrusions 331c1 towards the movement controlling plate 334.

Accordingly, even in the fourth embodiment where the electric parking brake apparatus includes the operation mechanism 330, an engagement amount of the driving shaft 331d of the inner cable 331 relative to the emergency release gear 29 may be sufficiently ensured even if a length of the inner cable 331 does not coincide with a length of the outer casing 332 or even if arrangement of the inner cable 331 and the outer casing 332 to the vehicle varies, as is the case with the first embodiment. Furthermore, according to the electric parking brake apparatus having the operation mechanism 330, the protrusions 331c1 are normally not allowed to pass through the movement controlling plate 334 by the restricting portions 334b. On the other hand, the protrusions 331c1 are allowed to pass through the movement controlling plate 334 via the respective allowing portions 334a in the case of the emergency. Accordingly, in the case of the emergency, the driving shaft 331d of the inner cable 331 may be engaged with the shaft bore 29a of the emergency release gear 29 by an operation from the vehicle interior in a manner where the inner cable 331 positioned at a set position for the normal state is rotated by a predetermined amount in response to the operation from the vehicle interior in order to allow the protrusions 331c1 to pass through the movement controlling plate 334 via the respective allowing portions 334a, and then the inner cable 331 is moved towards the actuator ACT. When the inner cable 331 is further rotated in order to rotate the emergency release gear 29, the first and second parking brakes 13 and 15 may be released without relying on the driving of the electric motor 11.

Furthermore, according to the electric parking brake apparatus having the operation mechanism 330, the driving shaft 331d of the inner cable 331 may be automatically engaged with the shaft bore 29a of the emergency release gear 29 in the case of the emergency in a manner where the inner cable 331 is rotated by a predetermined amount in response to the operation from the vehicle interior (i.e. the protrusions 331c1 are allowed to pass through the movement controlling plate 334 via the respective allowing portions 334a), and then, the inner cable 331 is moved towards the actuator ACT by the spring 333. Accordingly, the electric parking brake apparatus having a greater operability in the case of the emergency when comparing to the electric parking brake apparatus of the first, second and third embodiments may be achieved.

Figure 30:
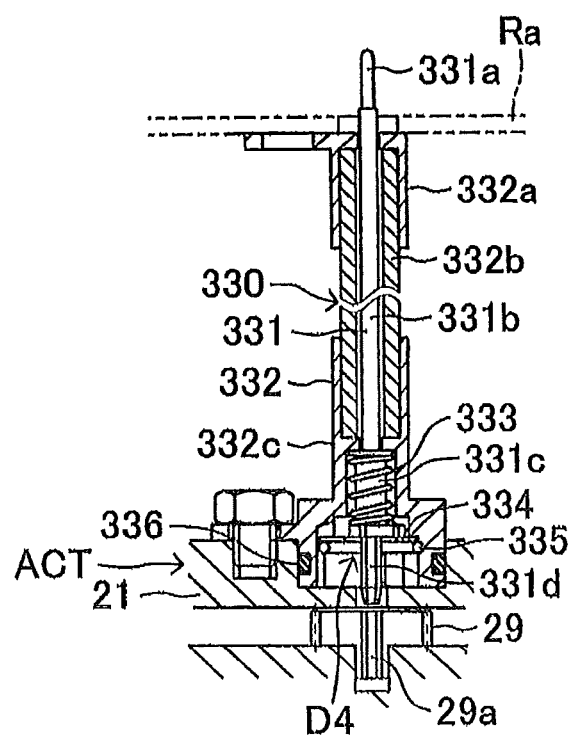
FIG. 30 is a diagram illustrating a state where the inner cable of the operation mechanism according to the fourth embodiment is rotated by a predetermined amount.
Figure 31:
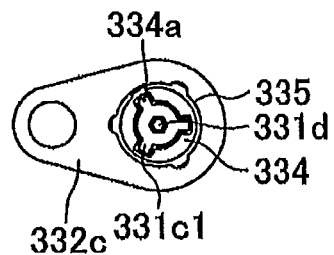
FIG. 31 is a diagram illustrating a configuration example of an end portion of the operation mechanism positioned closer to the actuator.
Figure 32:
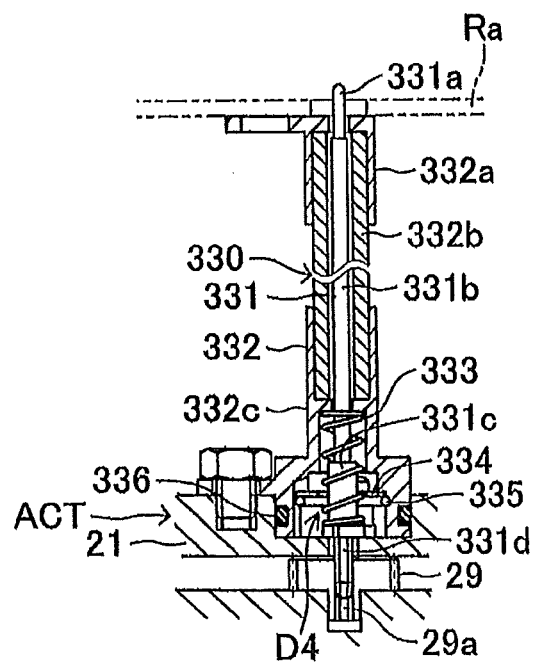
FIG. 32 is a diagram illustrating a state where the inner cable illustrated in FIG. 30 is pushed and displaced by a spring.
Figure 33:
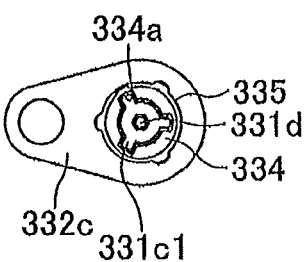
FIG. 33 is a diagram illustrating a configuration example of an end portion of the operation mechanism positioned closer to the actuator.
Figure 34:
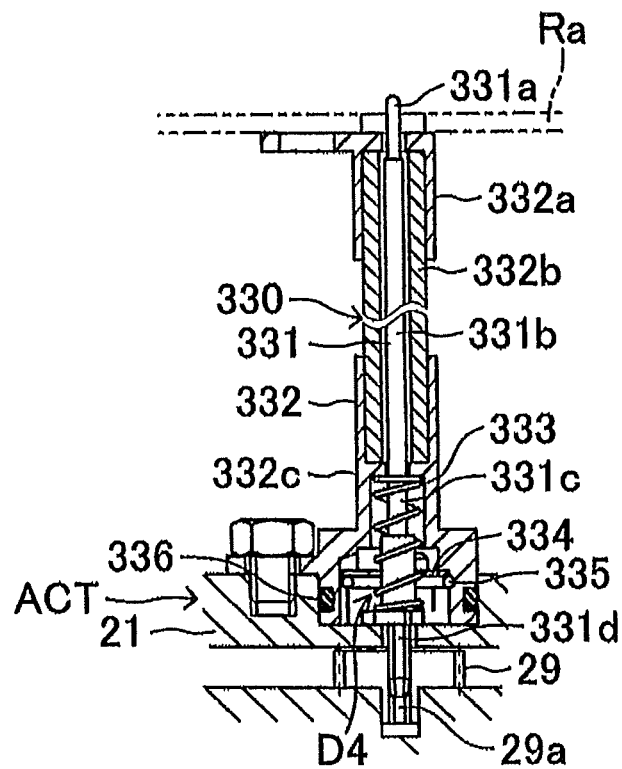
FIG. 34 is a diagram illustrating a state where the inner cable illustrated in FIG. 32 is rotated.
Figure 35:
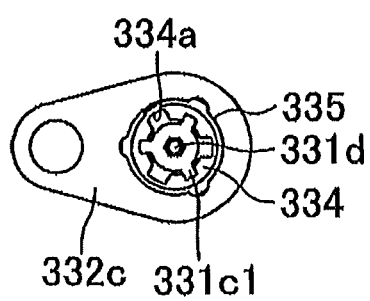
FIG. 35 is a diagram illustrating a configuration example of the end portion of the operation mechanism positioned closer to the actuator.

The normal state, i.e. the state where the protrusions are not allowed to pass through the movement controlling plate 334 by means of the respective preventing portions 334b, is illustrated in FIGS. 21 and 22. Illustrated in FIGS. 30 and 31 is a state where positions of the protrusions 331c1 correspond to positions of the allowing portions 334a of the movement controlling plate 334, respectively, at an early stage of the emergent release operation in the case of the emergency. Furthermore, illustrated in FIGS. 32 and 33 is a state where the inner cable 331 is pushed towards the actuator ACT by means of the spring 333 from the state illustrated in FIGS. 30 and 31. Illustrated in FIGS. 34 and 35 is a state where the inner cable 331 is rotated by the predetermined amount from the state illustrated in FIGS. 32 and 33.

Fifth Embodiment

The operation mechanism 430 of the fifth embodiment is disposed between the operation portion Ra, which is provided at the trunk room (i.e. the vehicle interior), and the actuator ACT. Furthermore, the operation mechanism 430 includes an inner cable 431 (an operation driving member) and an outer casing 432. The inner cable 431 is configured so as to rotatably drive the emergency release gear 29. The outer casing 432 accommodates therein the inner cable 431, a plate spring 433 formed in a cylindrical shape and a compression coil spring 434 (a biasing member).

Figure 36:
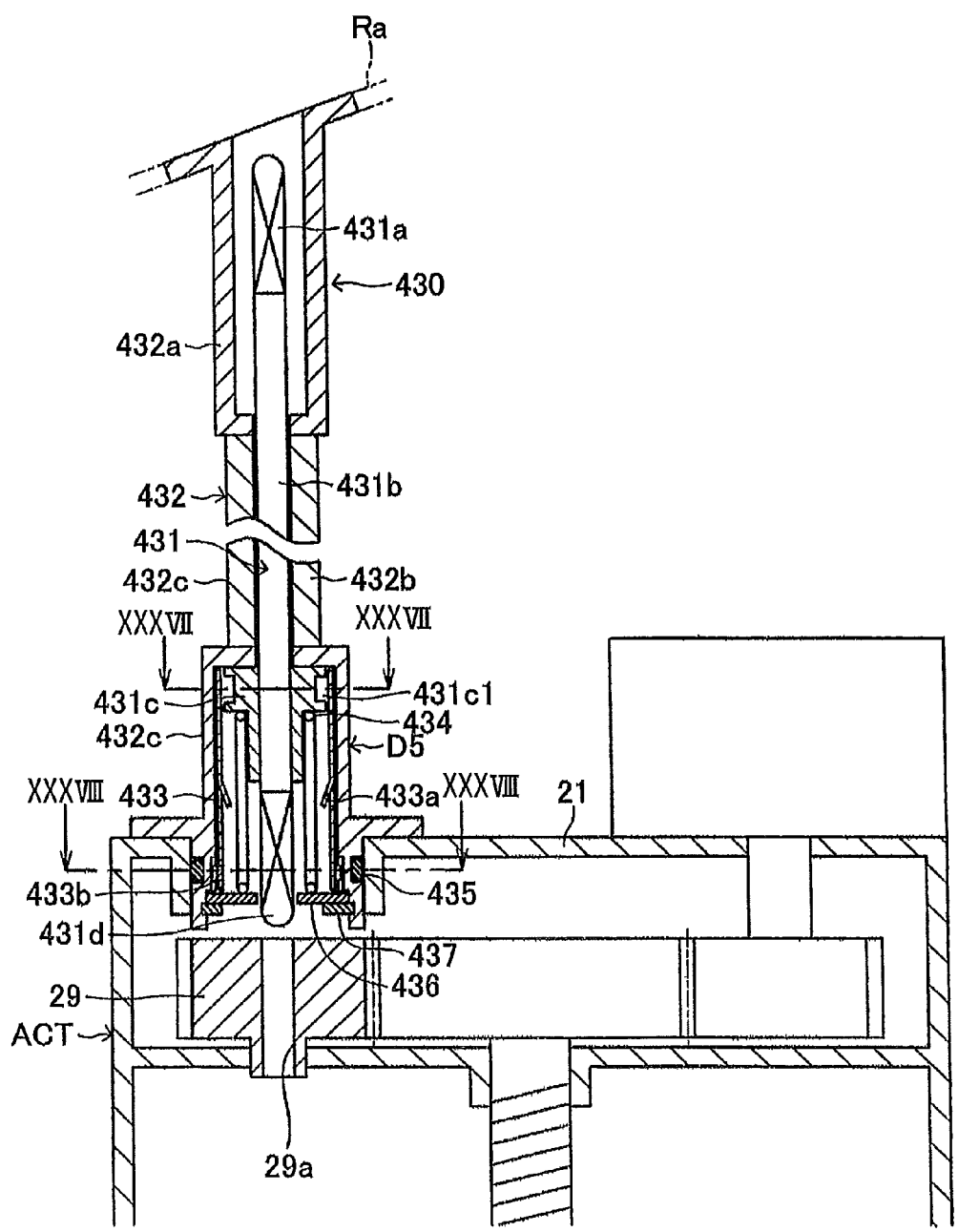
FIG. 36 is a diagram schematically illustrating a principal portion of an electric parking brake apparatus according to a fifth embodiment.
Figure 46:
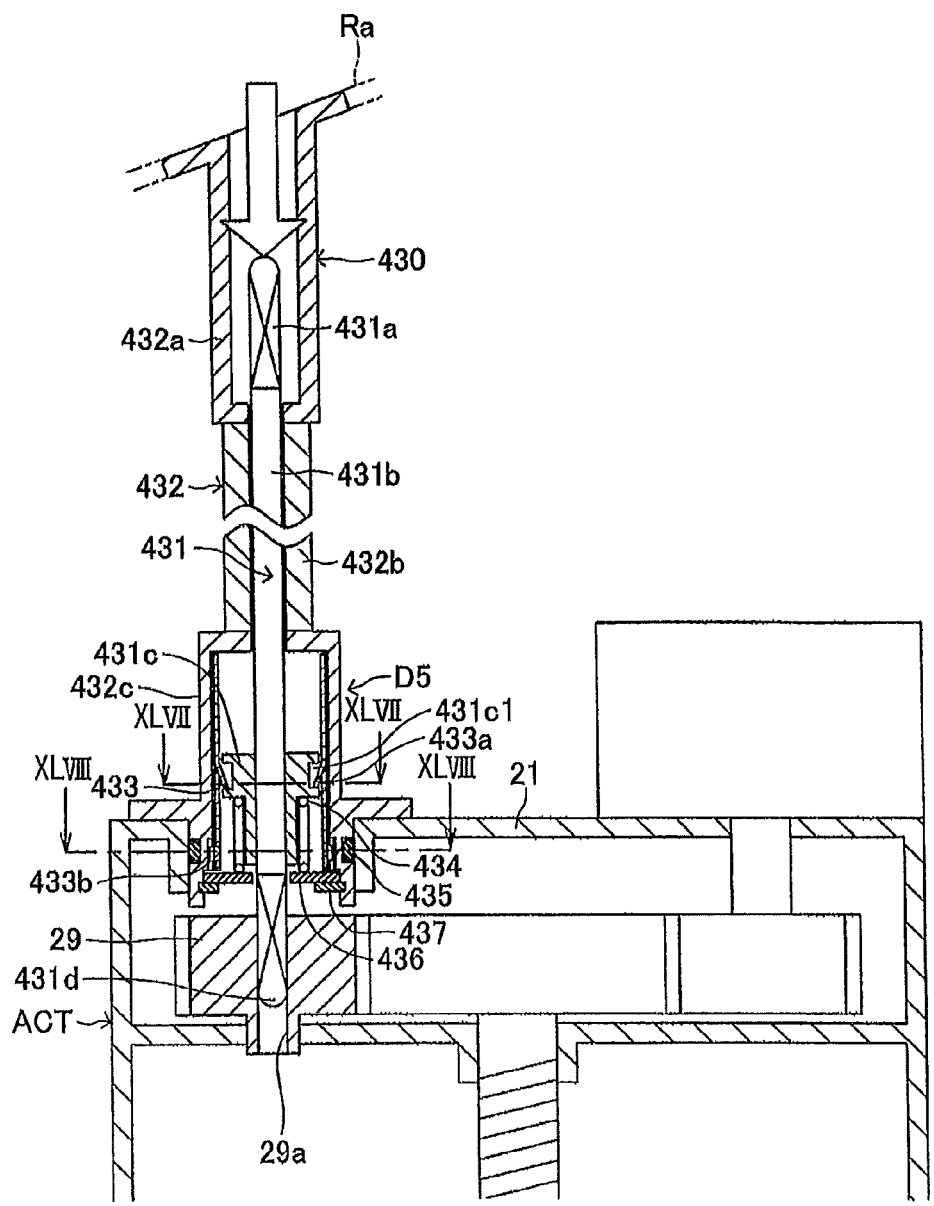
FIG. 46 is a diagram illustrating a state of the inner cable illustrated in FIG. 36 being pushed and displaced towards the actuator.

As illustrated in FIG. 36, the inner cable 431 includes a first cable end 431a positioned closer to the operation portion Ra, a cable main body 431b, a second cable end 431c (an engagement portion) positioned closer to the actuator ACT and a driving shaft 431d. The first cable end 431a positioned closer to the operation portion Ra, the second cable end 431c positioned closer to the actuator ACT and the driving shaft 431d are integrally connected within the outer casing 432 by means of an intermediate portion of the outer casing 432 (i.e. a casing main body (a flexible tube) 432b) and the cable main body 431b, which is formed to be flexible. The inner cable 431 is configured so that the driving shaft 431d is movable (so as to advance and withdraw) relative to the emergency release gear 29 and so as to be engageable with and disengageable from the emergency release gear 29. For example, in a case where an engagement state where the driving shaft 431d is engaged with the shaft bore 29a of the emergency release gear 29 so that the torque is transmittable therebetween is established (i.e. in a case where a state illustrated in FIG. 46 is established), the emergency release gear 29 may be rotatably driven via the driving shaft 431d. Additionally, a cross-sectional shape of the driving shaft 431d and a cross-sectional shape of the shaft bore 29a are formed in quadrangles (see FIGS. 38, 48 and 51).

The outer casing 432 includes a first casing cap 432a positioned closer to the operation portion Ra, the casing main body 432b (the flexible tube) and a second casing cap 432c positioned closer to the actuator ACT. The first casing cap 432a and the second casing cap 432c are integrally connected by means of the casing main body 432b, which is formed to be flexible. The first casing cap 432a of the outer casing 432 is fixed at the operation portion Ra, which is provided at the trunk room. On the other hand, the second casing cap 432c is fixed at the housing 21 of the actuator ACT via a seal ring 435.

The first cable end 431a positioned closer to the operation portion Ra is assembled to the first casing cap 432a positioned closer to the operation portion Ra so as to be movable in an up-and-down direction in FIG. 36 (so as to advance and withdraw) and so as to be rotatable relative to the first casing cap 432a. An end portion of the first cable end 431a positioned closer to the operation portion Ra is formed so that a cross-sectional shape of the first cable end 431a is formed in a quadrangle so as to be engageable with an end portion of a tool. Accordingly, the inner cable 431 may be manually rotatably operated by using the tool from the operation portion Ra, which is provided at the trunk room.

The second cable end 431c positioned closer to the actuator ACT is accommodated within the second casing cap 432c positioned closer to the actuator ACT together with the plate spring 433 and the compression coil spring 434. Furthermore, the second cable end 431c is configured so as to be movable (so as to advance and withdraw) relative to the second casing cap 432c and the plate spring 433 by a predetermined amount. The second cable end 431c positioned closer to the actuator ACT, the second casing cap 432c positioned closer to the actuator ACT, the plate spring 433, the compression coil spring 434 and the like configure a positioning mechanism D5. As illustrated in FIG. 36, the positioning mechanism D5 is provided at an end portion of the operation mechanism 430 positioned closer to the actuator ACT. The positioning mechanism D5 normally retains the driving shaft 431d of the inner cable 431 to be disengaged from the shaft bore 29a of the emergency release gear 29.

As illustrated in FIGS. 36, 37, 39 and 40, the second cable end 431c positioned closer to the actuator ACT is formed in a cylindrical shape having a stepped portion. Furthermore, a pair of cut-outs 431c1 is formed at an outer circumferential portion of an enlarged diameter portion of the second cable end 431c. More specifically, the cut-outs 431c1 are formed at the enlarged diameter portion of the second cable end 431c while forming 180 degrees between the cut-outs 431c1. The cut-outs 431c1 are formed at the outer circumferential portion of the enlarged diameter portion of the second cable end 431c so that the cut-outs 431c1 do not engage with respective engagement pieces 433a (i.e. inner engagement pieces 433a), which are provided at the plate spring 433 so as to inwardly protrude therefrom in a radial direction thereof, in a case where the inner cable 431 is pushed back to an initial position relative to the outer casing 432 by means of the compression coil spring 434 (i.e. a state illustrated in FIG. 36). On the other hand, in a case where the inner cable 431 is pushed towards the actuator ACT relative to the outer casing 32 by a predetermined amount (i.e. a state illustrated in FIGS. 46 and 49 where the inner cable 431 is displaced by the predetermined amount), the cut-outs 431c1 of the second cable end 431c becomes engageable with and disengageable from the inner engagement pieces 433a of the plate spring 433.

Figure 37:
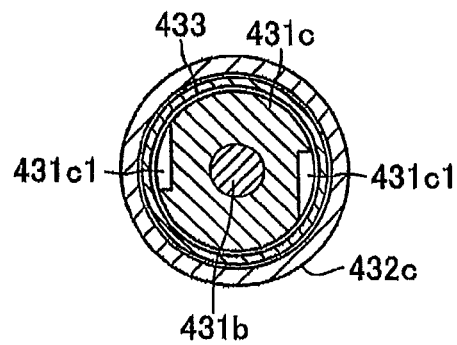
FIG. 37 is an enlarged cross-sectional diagram illustrating an operation mechanism taken along line XXXVII-XXXVII in FIG. 36.

Accordingly, in the case where the driving shaft 431d of the inner cable 431 is disengaged from the shaft bore 29a of the emergency release gear 29, the cut-outs 431c1 are not engageable with the respective inner engagement pieces 433a, as illustrated in FIGS. 36 and 37. On the other hand, in the case where the driving shaft 431d of the inner cable 431 is engaged with the shaft bore 29a of the emergency release gear 29, the cut-outs 431c are snappingly engaged with the inner engagement pieces 433a in a state where a rotation of the second cable end 431c relative to the plate spring 433 in a clockwise direction in FIGS. 47 and 50 (i.e. a rotation of the cut-outs 431c1 relative to the inner engagement piece 433a in the clockwise direction in FIGS. 47 and 50) is restricted by the cut-outs 431c1, while the rotation of the second cable end 431c relative to the plate spring 433 in a counterclockwise direction (i.e. a rotation of the cut-outs 431c1 relative to the inner engagement piece 433a in the counterclockwise direction) is allowed.

As illustrated in FIGS. 36 to 38, 41 and 42, the second casing cap 432c positioned closer to the actuator ACT includes a first annular groove 432c1 for attaching therein the seal ring 435, an inner serration portion 432c2 formed at an inner circumferential portion of the first annular groove 432c1, a stepped portion 432c3 for determining a position of a plate 436, which retains the plate spring 433 and the compression coil spring 434 so as not to be disengaged from the second casing cap 432c, and a second annular groove 432c4 for attaching therein a clip 437, which retains the plate 436 so as not to be disengaged from the second casing cap 432c. The compression coil spring 434 is accommodated within the plate spring 433, which is formed in the cylindrical shape. Furthermore, the compression coil spring 434 is disposed between the second cable end 431c positioned closer to the actuator ACT and the plate 436, so that the compression coil spring 434 biases the second cable end 431c towards the stepped portion of the second casing cap 432c (i.e. towards an initial position where the driving shaft 431d of the inner cable 431 is moved away from and disengaged from the emergency release gear 29, see FIG. 36).

Figure 38:
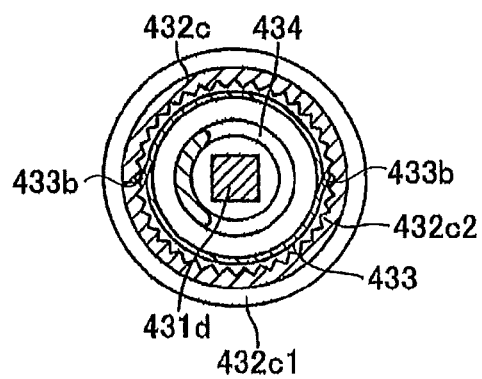
FIG. 38 is an enlarged cross-sectional diagram illustrating the operation mechanism taken along line XXXVIII-XXXVIII in FIG. 36.
Figure 39:
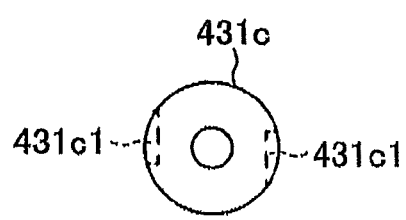
FIG. 39 is a plane view illustrating a single cable end positioned closer to an actuator illustrated in FIGS. 36 and 37.
Figure 40:
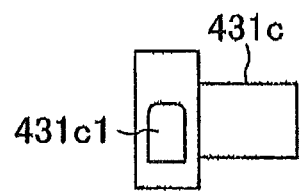
FIG. 40 is a side view illustrating the cable end positioned closer to the actuator illustrated in FIG. 39.
Figure 41:
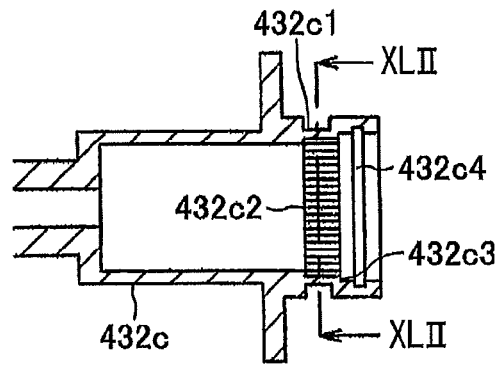
FIG. 41 is a cross-sectional diagram illustrating an end portion of a single outer casing positioned closer to the actuator.
Figure 42:
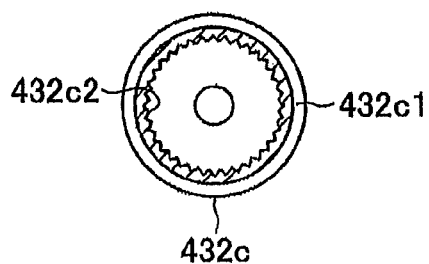
FIG. 42 is a cross-sectional diagram illustrating the single outer casing taken along line XLII-XLII in FIG. 41.
Figure 43:
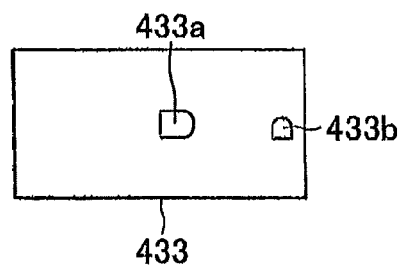
FIG. 43 is a side view illustrating a single plate spring illustrated in FIGS. 36 to 38.
Figure 44:
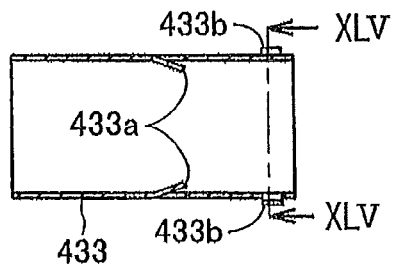
FIG. 44 is a center cross-sectional diagram illustrating the spring plate illustrated in FIG. 43.
Figure 45:
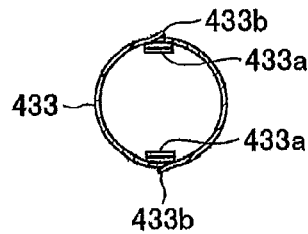
FIG. 45 is a cross-sectional diagram illustrating the plate spring taken along line XLV-XLV in FIG. 44.

As illustrated in FIGS. 36 to 38 and 43 to 45, the plate spring 433 includes the pair of inner engagement pieces 433a and a pair of outer engagement pieces 433b. The outer engagement pieces 433b are formed at the plate spring 433 so as to outwardly protrude in the radial direction of the plate spring 433. Furthermore, the outer engagement pieces 433b are formed so as to be snappingly engageable with the inner serration portion 432c2 of the second casing cap 432c. The plate spring 433 is provided within the second casing cap 432c while being spaced away from an outer circumferential surface of the inner cable 431. As illustrated in FIG. 38, the outer engagement pieces 433b are formed at the plate spring 433 so as to outwardly protrude in a single direction relative to the circumferential direction of the plate spring 433. Furthermore, the outer engagement pieces 433b are engaged with the inner serration portion 432c2 of the second casing cap 432c positioned closer to the actuator ACT in a state where a rotation of the plate spring 433 relative to the second casing cap 432c in a counterclockwise direction (i.e. a rotation of the outer engagement pieces 433b relative to the inner serration 432c2 in the counterclockwise direction) is restricted, while the rotation of the plate spring 433 relative to the second casing cap 432c in a clockwise direction (i.e. the rotation of the outer engagement pieces 433b relative to the inner serration 432c2 in the clockwise direction) is allowed, in other words, in a state where the inner cable 431 is rotatable in a direction of releasing the parking brakes 13 and 15 (a parking brake releasing direction) while the inner cable 431 is not rotatable in a direction of actuating the parking brakes 13 and 15 (a parking brake actuating direction).

Accordingly, even in the fifth embodiment where the electric parking brake apparatus includes the operation mechanism 430, an engagement amount of the driving shaft 431d of the inner cable 431 relative to the emergency release gear 29 may be sufficiently ensured even if a length of the inner cable 431 does not coincide with a length of the outer casing 432 or even if arrangement of the inner cable 431 and the outer casing 432 to the vehicle varies, as is the case with the first embodiment. Furthermore, according to the electric parking brake apparatus having the operation mechanism 430, the driving shaft 431d of the inner cable 431 may be engaged with the shaft bore 29a of the emergency release gear 29 in response to the operation from the vehicle interior in the case of the emergency in a manner where the inner cable 431 is pushed towards the actuator ACT so as to resist against a biasing force generated by the compression coil spring 434 so that a state of the inner cable 431 is turned to be a state illustrated in FIGS. 46 to 48 from a state illustrated in FIGS. 36 to 38. Then, when the inner cable 431 is rotated in a direction indicated by an arrow illustrated in FIG. 47, i.e. in the clockwise direction (the parking brake releasing direction), in order to rotate the emergency release gear 29, the first and second parking brakes 13 and 15 may be release without relying on the driving of the electric motor 11.

According to the electric parking brake apparatus having the operation mechanism 430, the inner engagement pieces 433a of the plate spring 433 is normally disengaged from the second cable end 431c positioned closer to the actuator ACT and the second cable end 431c is biased towards the stepped portion of the second casing cap 432c by means of the compression coil spring 434 (see FIGS. 36 to 38). Therefore, the driving shaft 431d of the inner cable 431 is surely and appropriately disengaged from the shaft bore 29a of the emergency release gear 29 in the normal situation.

Figure 47:
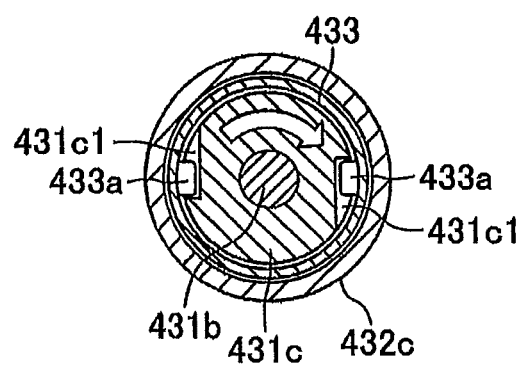
FIG. 47 is an enlarged cross-sectional diagram illustrating the operation mechanism taken along line XLVII-XLVII in FIG. 46.
Figure 48:
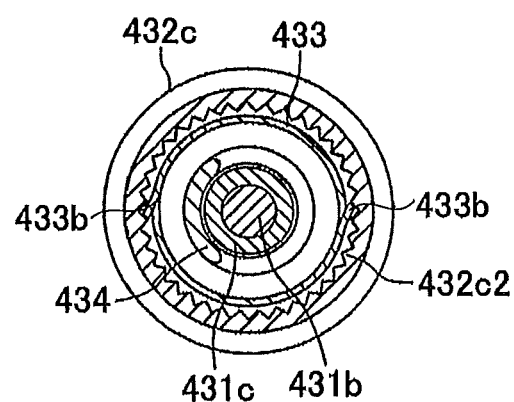
FIG. 48 is an enlarged cross-sectional diagram illustrating the operation mechanism taken along line XLVIII-XLVIII in FIG. 46.
Figure 49:
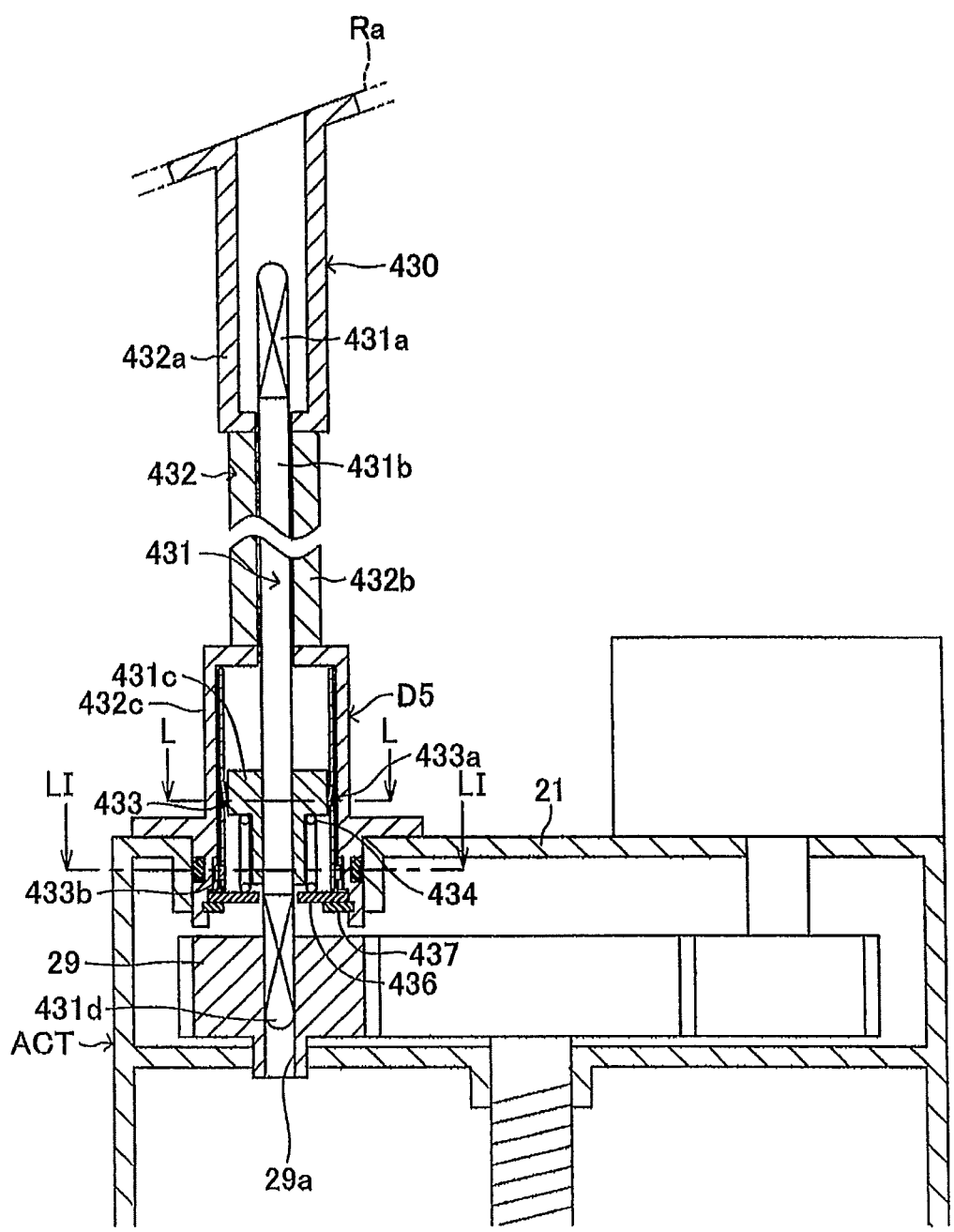
FIG. 49 is a diagram illustrating a state where the inner cable is rotated in a parking brake actuating direction, which is opposite to a parking brake releasing direction.
Figure 50:
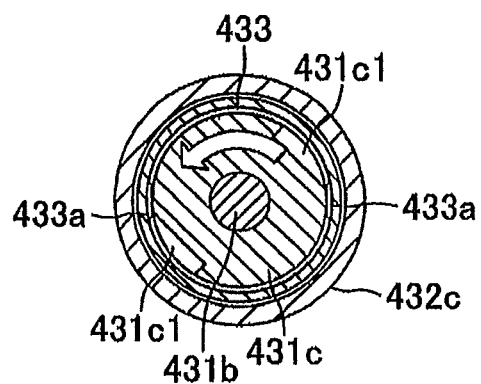
FIG. 50 is an enlarged cross-sectional diagram illustrating the operation mechanism taken along line L-L in FIG. 49.
Figure 51:
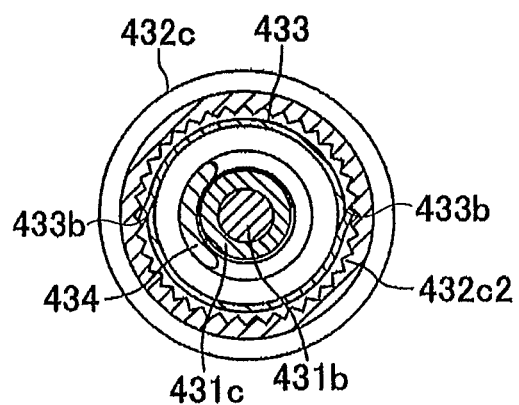
FIG. 51 is an enlarged cross-sectional diagram illustrating the operation mechanism taken along line LI-LI in FIG. 49.
Figure 52:
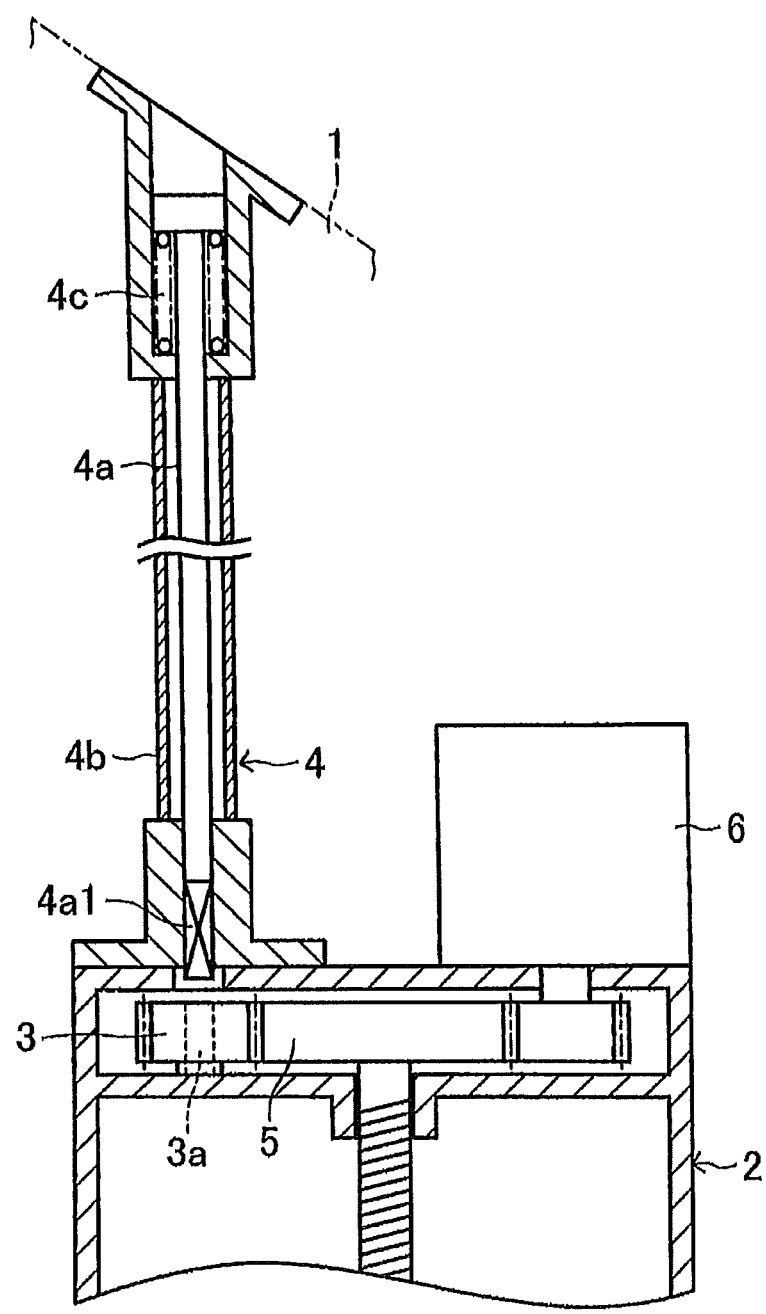
FIG. 52 is a diagram schematically illustrating an electric parking brake apparatus according a known art having a positioning mechanism at an end portion of an operation mechanism, which is disposed between an operation portion provided at a vehicle interior and an actuator, positioned closer to the vehicle interior.

Furthermore, in the case of the emergency, the inner engagement pieces 433a of the plate spring 433 are snappingly engaged with the respective cut-outs 431c1 of the second cable end 431c, so that the second cable end 431c is retained at a position where the inner engagement pieces 433a are engaged with the respective cut-outs 431c1 while resisting against a spring force of the compression coil spring 434 (see FIGS. 46 to 48). Therefore, the driving shaft 431d of the inner cable 431 is surely and properly engaged with the shaft bore 29a of the emergency release gear 29 in the case of the emergency. Accordingly, the electric parking brake apparatus having a greater operability in the case of the emergency is achieved. Furthermore, in this case, because the plate spring 433 and the inner cable 431 are rotated together as a unit in a clockwise direction in FIGS. 47 and 48 (i.e. in the direction of releasing the first and second parking brakes 13 and 15) while the outer engagement pieces 433b of the plate spring 433 get over each tooth of the inner serration portion 432c2 of the second casing cap 432c, a user may obtains an operational feeling (i.e. the user may appropriately feel that the inner cable 431 is surely rotated when the user operates the operation mechanism 430).

According to the fifth embodiment, the inner engagement pieces 433a of the plate spring 433 is snappingly engaged with the second cable end 431c positioned closer to the actuator ACT while the electric parking brake apparatus is in the state illustrated in FIGS. 46 to 48 (i.e. a emergent release state), while allowing the second cable end 431c to rotate in the counterclockwise direction in FIGS. 47 and 48 relative to the inner engagement pieces 433a. On the other hand, the outer engagement pieces 433b of the plate spring 433 restrict the rotation of the second casing cap 432c (i.e. the inner serration portion 432c2) in the counterclockwise direction in FIGS. 47 and 48. Accordingly, in the above-described state, in a case where the inner cable 431 is rotated in a counterclockwise direction in FIG. 50 in order to rotate the second cable end 431c in the counterclockwise direction (i.e. a direction indicated by an arrow in FIG. 50), an engagement between the cut-outs 431c1 of the second cable end 431c and the respective inner engagement pieces 433a of the plate spring 433 may be cancelled (see FIGS. 49 to 51).

Accordingly, the inner cable 431 including the second cable end 431c positioned closer to the actuator ACT is movable towards the stepped portion of the second casing cap 432c positioned closer to the actuator ACT by the spring force of the compression coil spring 434, so that the inner cable 431 is returned to the state illustrated in FIGS. 36 to 38 (i.e. a normal state). Additionally, in this case, when the inner cable 431 is continuously rotated in the direction indicated by the arrow in FIG. 50 while the inner cable 431 is being pushed towards the actuator ACT so as to resist against the spring force of the compression coil spring 434, the first and second parking brakes 13 and 15 may be manually actuated.

Accordingly, the strokes necessary for the second cable end (31c, 131c, 231c, 331c 431c) of the inner cable (31, 131, 231, 331, 431) to be moved from the withdrawal position to the engaged position may be properly set (controlled) without being influenced by variations of the length of the inner cable (31, 131, 231, 331, 431) or variations of arrangement of the inner cable (31, 131, 231, 331, 431) to the vehicle. As a result, the engagement amount of the driving shaft (31d, 131d, 231d, 331d, 431d) of the inner cable (31, 131, 231, 331, 431) relative to the emergency release gear (29) may be sufficiently ensured without being influenced by the variations of the length of the inner cable (31, 131, 231, 331, 431) or the variations of the arrangement of the inner cable (31, 131, 231, 331, 431) to the vehicle.

According to the second embodiment, the positioning mechanism (D2) includes the internal thread (132c1) formed at the second casing cap (132c), which is fixed at the housing (21) of the actuator (ACT) and which accommodates the inner cable (131) while allowing the inner cable (131) to move towards and away from the emergency release gear (29), and the external thread (131c1), which is integrally formed at the inner cable (131) and which is threadedly engageable with the internal thread (132c1) by the predetermined amount. The external thread (131c1) is threadedly engaged with the internal thread (132c1) in the case where the inner cable (131) is disengaged from the emergency release gear (29), and the external thread (131c1) is disengaged from the internal thread (132c1) in the case where the inner cable (131) is engaged with the emergency release gear (29).

Accordingly, the engagement amount of the driving shaft (131d) of the inner cable (131) relative to the emergency release gear (29) may be sufficiently ensured without being influenced by the variations of the length of the inner cable (131) or the variations of the arrangement of the inner cable (131) to the vehicle. Furthermore, the inner cable (131) may be engaged with the emergency release gear (29) in the case of the emergency in the manner where the inner cable (131) is rotated in response to the operation from the vehicle interior in order to disengage the external thread 131c1 from the internal thread 132c1 and then, the inner cable (131) is pushed towards the actuator (ACT). Then, when the inner cable (131) is further rotated while the above-described state is established in order to rotate the emergency release gear (29), the first and second parking brakes (13, 15) may be released without relying on the driving of the electric motor (11). In this case, because a spring member does not need to be provided at the positioning mechanism (D2), the number of components used for the electric parking brake apparatus may be reduced, which may further result in reducing the manufacturing costs of the electric parking brake apparatus. Furthermore, in this case, because an operation of resisting against a biasing force generated by the spring member is not necessary in the case of the emergency. Accordingly, the electric parking brake apparatus having a greater operability in the case of the emergency may be achieved.

According to the third embodiment, the positioning mechanism (D3) includes the plate spring (233), which is provided within the second casing cap (232c) fixed at the housing (21) of the actuator (ACT) and accommodating the inner cable (231) to be movable towards and away from the emergency release gear (29), and the engagement portion (231c1, 231c2), which is integrally formed at the inner cable (231) and is engageable with and disengageable from the plate spring (233). The plate spring (233) engages with the engagement portion (231c1, 231c2) in the case where the inner cable (231) is disengaged from the emergency release gear (29). On the other hand, in the case where the inner cable (231) is engaged with the emergency release gear (29), the plate spring (233) is disengaged from the engagement portion (231c1, 231c2).

Accordingly, the engagement amount of the driving shaft (231d) of the inner cable (231) relative to the emergency release gear (29) may be sufficiently ensured without being influenced by the variations of the length of the inner cable (231) or the variations of the arrangement of the inner cable (231) to the vehicle. Furthermore, in the case of the normal situation, because the electric parking brake apparatus is configured so that the plate spring (233) engages with the first engagement portion (231c1), the inner cable (231) is surely and properly disengaged from the emergency release gear (29).

According to the third embodiment, the positioning mechanism (D3) includes the plate spring (233), which is provide within the second casing cap (232c) fixed at the housing (21) of the actuator (ACT) and accommodating the inner cable (231) to be movable towards and away from the emergency release gear (29), and first and second engagement portions (231c1, 231c2), which are integrally formed at the inner cable (231) so as to be engageable with and disengageable from the plate spring (233) and which are arranged away from each other by a predetermined distance in an advance-and-withdraw direction (i.e., the axial direction of the inner cable (231)). The plate spring (233) engages with the first engagement portion (231c1) in the case where the inner cable (231) is disengaged from the emergency release gear (29). On the other hand, in the case where the inner cable (231) is engaged with the emergency release gear (29), the plate spring (233) is engaged with the second engagement portion (231c2), while allowing the inner cable (231) to rotate.

Accordingly, the engagement amount of the driving shaft (231d) of the inner cable (231) relative to the emergency release gear (29) may be sufficiently ensured without being influenced by the variations of the length of the inner cable (231) or the variations of the arrangement of the inner cable (231) to the vehicle. Furthermore, in the case of the normal situation, because the electric parking brake apparatus is configured so that the plate spring (233) engaged with the first engagement portion (231c1), the inner cable (231) is surely and properly disengaged from the emergency release gear (29). On the other hand, in the case of the emergency, the plate spring (233) engages with the second engagement portion (231c2), so that the inner cable (231) is surely and properly engaged with the emergency release gear (29). Accordingly, the electric parking brake apparatus having a greater operability in the case of the emergency may be achieved.

According to the fourth embodiment, the positioning mechanism (D4) includes plural protrusions (331c1), which are integrally formed at the inner cable (331) so as to outwardly protrude in the radial direction thereof, and the movement controlling plate (334), which is provided within the second casing cap (332c) fixed at the housing (21) of the actuator (ACT) and accommodating the inner cable (331) to be movable towards and away from the emergency release gear (29). The movement controlling (334) includes plural allowing portions (334a) for allowing the respective protrusions (331c1) to pass through the movement controlling plate (334) via the respective allowing portions (334a) and plural restricting portions (334b) for not allowing the respective protrusion (331c1) to pass through the movement controlling plate (334). The allowing portions (334a) are formed at the movement controlling plate (334) so as to be spaced away from each other by a predetermined distance in the circumferential direction thereof. The restricting portions (334b) are formed at the movement controlling plate (334) so as to be spaced away from each other by a predetermined distance in the circumferential direction thereof. The inner cable (331) is disengaged from the emergency release gear (29) in the case where the protrusions (331c1) are not allowed to pass through the movement controlling plate (334) by means of the respective restricting portions (334b). On the other hand, in the case where the protrusions (331c1) are allowed to pass through the movement controlling plate (334) via the respective allowing portions (334a), the inner cable (331) becomes engageable with the emergency release gear (29).

Accordingly, the engagement amount of the driving shaft (331d) of the inner cable (331) relative to the emergency release gear (29) may be sufficiently ensured without being influenced by the variations of the length of the inner cable (331) or the variations of the arrangement of the inner cable (331) to the vehicle. Furthermore, the electric parking brake apparatus is configured so that the protrusions (331c1) normally do not pass through the movement controlling plate (334) because of the respective restricting portions 334b. On the other hand, in the case of the emergency, the protrusions (331c1) are allowed to pass through the movement controlling plate (334) via the respective allowing portions (334a). Accordingly, in the case of the emergency, the inner cable (331) may be engaged with the emergency release gear (29) in the manner where the inner cable (331) positioned at the set position for the normal situation is rotated by the predetermined amount in response to the operation from the vehicle interior in order to allow the protrusions (331c1) to pass through the movement controlling plate (334) via the respective allowing portions (334a), and then, the inner cable (331) is pushed towards the actuator (ACT). When the inner cable (331) is further rotated while the above-described state is established in order to rotate the emergency release gear (29), the first and second parking brakes (13, 15) may be released without relying on the driving of the electric motor (11).

Accordingly, the electric parking brake apparatus having a greater operability in the case of the emergency may be achieved.

According to the fourth embodiment, the electric parking brake apparatus further includes the spring (333) between plural protrusions (331c1) and the second casing cap (332c) so as to bias the protrusions (331c1) towards the movement controlling plate (334).

Accordingly, in the case of the emergency, the inner cable (331) may be rotated by the predetermined amount in response to the operation from the vehicle interior (in order to allow the protrusions 331c1 to pass through the movement controlling plate 334 via the respective allowing portions (334a)), so that the inner cable (331) is allowed to be pushed towards the actuator (ACT). As a result, the inner cable (331) may be automatically engaged with the emergency release gear (29). Accordingly, the electric parking brake apparatus having a greater operability in the case of the emergency may be achieved.

According to the fifth embodiment, the positioning mechanism (D5) includes the plate spring (433) formed in the cylindrical shape, the second cable end (431c) and the compression coil spring (434). The plate spring (433) is provided within the second casing cap (432c), which is fixed at the housing (21) of the actuator (ACT) and accommodates the inner cable (431) while allowing the inner cable (431) to be movable towards and away from the emergency release gear (29) and to be rotatable, so as to be away from the outer circumferential surface of the inner cable (431), while allowing the inner cable (431) to be rotatable in the parking brake releasing direction and not allowing the inner cable (431) to be rotatable in the parking brake actuating direction. The second cable end (431c) is integrally formed at the inner cable (431) and includes the cut-out (431c1) at the outer circumferential portion of the second cable end (431c) so as to be engageable with and disengageable from the inner engagement piece (433a) of the plate spring (433) in the state where the inner cable (431) is displaced towards the actuator (ACT) by a predetermined amount relative to the second casing cap (432c) from an initial position. The compression coil spring (434) is accommodated within the plate spring (433) and biases the second cable end (431c) towards the initial position where the inner cable (431) is disengaged from the emergency release gear (29). The inner engagement piece (433a) of the plate spring (433) is not allowed to be engaged with the cut-out (431c1) of the second cable end (431c) in the case where the inner cable (431) is disengaged from the emergency release gear (29). On the other hand, in the case where the inner cable (431) is engaged with the emergency release gear (29), the inner engagement piece (433a) of the plate spring (433) is snappingly engaged with the cut-out (431c1) of the second cable end (431c), while not allowing the rotation of the inner cable (431) in the parking brake releasing direction and allowing the rotation of the inner cable (431) in the parking brake actuating direction.

Accordingly, the engagement amount of the driving shaft (431d) of the inner cable (431) relative to the emergency release gear (29) may be sufficiently ensured without being influenced by the variations of the length of the inner cable (431) or the variations of the arrangement of the inner cable (431) to the vehicle. Furthermore, the electric parking brake apparatus is configured so that the inner cable (431) is normally retained at the initial position where the inner cable (431) is disengaged from the emergency release gear (29) by means of the compression coil spring (434). Accordingly, the inner cable (431) is surely and properly disengaged from the emergency release gear (29) in the case of the normal situation. Furthermore, the electric parking brake apparatus is configured so that the inner engagement pieces (433*a*) of the plate spring (433) are snappingly engaged with the respective cut-outs (431*c*1) of the inner cable (431) so as to retain the inner cable (431) while resisting against the biasing force generated by the compression coil spring (434) in the case of the emergency. Accordingly, the electric parking brake apparatus having a greater operability in the case of the emergency may be achieved.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An electric parking brake apparatus having an emergency releasing function for a vehicle, comprising:
   an actuator having a driven member for controlling a parking brake to be in an actuated state and a released state in response to a driving of an electric motor; and
   an emergency release mechanism being operable from a vehicle interior, controlling the parking brake to be released without relying on the driving of the electric motor, and including an emergency driving member, which is provided within the actuator and which drives the driven member, and an operation mechanism, which is provided between an operation portion provided at the vehicle interior and the actuator and which drives the emergency driving member, wherein
   the operation mechanism includes an operation driving member, which is movable towards and away from the emergency driving member so that the operation driving member is engaged with and disengaged from the emergency driving member and which drives the emergency driving member in a case where the operation driving member is engaged with the emergency driving member, and a positioning mechanism, which retains the operation driving member to be disengaged from the emergency driving member in a normal situation,
   the positioning mechanism is provided at one end portion of the operation mechanism, the one end portion being closer to the actuator relative to an other end portion of the operation mechanism, and
   the positioning mechanism includes a plate spring, which is provided within a holder fixed at a housing of the actuator and accommodating the operation driving member to be movable towards and away from the emergency driving member, and an engagement portion, which is integrally formed at the operation driving member and is engageable with and disengageable from the plate spring, the plate spring engages with the engagement portion in a case where the operation driving member is disengaged from the emergency driving member, and the plate spring is disengaged from the engagement portion in a case where the operation driving member is engaged with the emergency driving member.

2. An electric parking brake apparatus having an emergency releasing function for a vehicle, comprising:
   an actuator having a driven member for controlling a parking brake to be in an actuated state and a released state in response to a driving of an electric motor; and
   an emergency release mechanism being operable from a vehicle interior, controlling the parking brake to be released without relying on the driving of the electric motor, and including an emergency driving member, which is provided within the actuator and which drives the driven member, and an operation mechanism, which is provided between an operation portion provided at the vehicle interior and the actuator and which drives the emergency driving member, wherein
   the operation mechanism includes an operation driving member, which is movable towards and away from the emergency driving member so that the operation driving member is engaged with and disengaged from the emergency driving member and which drives the emergency driving member in a case where the operation driving member is engaged with the emergency driving member, and a positioning mechanism, which retains the operation driving member to be disengaged from the emergency driving member in a normal situation,
   the positioning mechanism is provided at one end portion of the operation mechanism, the one end portion being closer to the actuator relative to an other end portion of the operation mechanism, and
   the positioning mechanism includes a plate spring formed in a cylindrical shape, an engagement portion and a biasing member, the plate spring is provided within a holder, which is fixed at a housing of the actuator and accommodates the operation driving member while allowing the operation driving member to be movable towards and away from the emergency driving member and to be rotatable, so as to be away from an outer circumferential surface of the operation driving member, while allowing the operation driving member to be rotatable in a parking brake releasing direction and not allowing the driving member to be rotatable in a parking brake actuating direction, the engagement portion is integrally formed at the operation driving member and includes a cut-out at an outer circumferential portion of the engagement portion so as to be engageable with and disengageable from an inner engagement piece of the plate spring in a state where the operation driving member is displaced towards the actuator by a predetermined amount relative to the holder from an initial position, the biasing member is accommodated within the plate spring and biases the engagement portion towards the initial position where the operation driving member is disengaged from the emergency driving member, the inner engagement piece of the plate spring is not allowed to be engaged with the cut-out of the engagement portion in a case where the operation driving member is disengaged from the emergency driving member, and the inner engagement piece of the plate spring is snappingly engaged with the cut-out of the engagement portion in a case where the operation driving member is engaged with the emergency driving member while not allowing a rotation of the operation driving member in the parking brake releasing direction and allowing the rotation of the operation driving member in the parking brake actuating direction.

3. An electric parking brake apparatus having an emergency releasing function for a vehicle, comprising:
   an actuator having a driven member for controlling a parking brake to be in an actuated state and a released state in response to a driving of an electric motor; and an emergency release mechanism being operable from a vehicle interior, controlling the parking brake to be released without relying on the driving of the electric motor, and including an emergency driving member, which is provided within the actuator and which drives the driven member, and an operation mechanism, which is provided between an operation portion provided at the vehicle interior and the actuator and which drives the emergency driving member, wherein the operation mechanism includes an operation driving member, which is movable towards and away from the emergency driving member so that the operation driving member is engaged with and disengaged from the emergency driving member and which drives the emergency driving member in a case where the operation driving member is engaged with the emergency driving member, and a positioning mechanism, which retains the operation driving member to be disengaged from the emergency driving member in a normal situation, and the positioning mechanism is provided at the actuator.

4. The electric parking brake apparatus having the emergency release function for the vehicle according to claim 3, wherein the positioning mechanism includes an internal thread formed at a holder, which is fixed at a housing of the actuator and which accommodates the operation driving member while allowing the operation driving member to move towards and away from the emergency driving member, and an external thread, which is integrally formed at the operation driving member and which is threadedly engageable with the internal thread by a predetermined amount, the external thread is threadedly engaged with the internal thread in a case where the operation driving member is disengaged from the emergency driving member, and the external thread is disengaged from the internal thread in a case where the operation driving member is engaged with the emergency driving member.

5. The electric parking brake apparatus having the emergency release function for the vehicle according to claim 3, wherein the positioning mechanism includes a plate spring, which is provided within a holder fixed at a housing of the actuator and accommodating the operation driving member to be movable towards and away from the emergency driving member, and an engagement portion, which is integrally formed at the operation driving member and is engageable with and disengageable from the plate spring, the plate spring engages with the engagement portion in a case where the operation driving member is disengaged from the emergency driving member, and the plate spring is disengaged from the engagement portion in a case where the operation driving member is engaged with the emergency driving member.

6. The electric parking brake apparatus having the emergency release function for the vehicle according to claim 3, wherein the positioning mechanism includes a plate spring, which is provide within a holder fixed at a housing of the actuator and accommodating the operation driving member to be movable towards and away from the emergency driving member, and first and second engagement portions, which are integrally formed at the operation driving member so as to be engageable with and disengageable from the plate spring and which are arranged away from each other by a predetermined distance in an advance-and-withdraw direction, the plate spring engages with the first engagement portion in a case where the operation driving member is disengaged from the emergency driving member, and the plate spring is engaged with the second engagement portion in a case where the operation driving member is engaged with the emergency driving member while allowing the operation driving member to rotate.

7. The electric parking brake apparatus having the emergency release function for the vehicle according to claim 3, wherein the positioning mechanism includes a plurality of protrusions, which are integrally formed at the operation driving member so as to outwardly protrude in a radial direction thereof, and a movement controlling member, which is provided within a holder fixed at a housing of the actuator and accommodating the operation driving member to be movable towards and away from the emergency driving member, the movement controlling member includes a plurality of allowing portions for allowing the respective protrusions to pass through the movement controlling member via the respective allowing portions and a plurality of restricting portions for not allowing the respective protrusion to pass through the movement controlling member, the allowing portions are formed at the movement controlling member so as to be spaced away from each other by a predetermined distance in a circumferential direction thereof, the restricting portions are formed at the movement controlling member so as to be spaced away from each other by a predetermined distance in the circumferential direction thereof, the operation driving member is disengaged from the emergency driving member in a case where the protrusions are not allowed to pass through the movement controlling member by means of the respective restricting portions, and the operation driving member becomes engageable with the emergency driving member in a case where the protrusions are allowed to pass through the movement controlling member via the respective allowing portions.

8. The electric parking brake apparatus having the emergency release function for the vehicle according to claim 7 further includes a spring between the plurality of the protrusions and the holder so as to bias the protrusions towards the movement controlling member.

9. The electric parking brake apparatus having the emergency release function for the vehicle according to claim 3, wherein the positioning mechanism includes a plate spring formed in a cylindrical shape, an engagement portion and a biasing member, the plate spring is provided within a holder, which is fixed at a housing of the actuator and accommodates the operation driving member while allowing the operation driving member to be movable towards and away from the emergency driving member and to be rotatable, so as to be away from an outer circumferential surface of the operation driving member, while allowing the operation driving member to be rotatable in a parking brake releasing direction and not allowing the driving member to be rotatable in a parking brake actuating direction, the engagement portion is integrally formed at the operation driving member and includes a cut-out at an outer circumferential portion of the engagement portion so as to be engageable with and disengageable from an inner engagement piece of the plate spring in a state where the operation driving member is displaced towards the actuator by a predetermined amount relative to the holder from an initial position, the biasing member is accommodated within the plate spring and biases the engagement portion towards the initial position where the operation driving member is disengaged from the emergency driving member, the inner engagement piece of the plate spring is not allowed to be engaged with the cut-out of the engagement portion in a case where the operation driving member is disengaged from the emergency driving member, and the inner engagement piece of the plate spring is snappingly engaged with the cut-out of the engagement portion in a case where the operation driving member is engaged with the emergency driving member while not allowing a rotation of the operation driving member in a parking brake releasing direction and allowing the rotation of the operation driving member in a parking brake actuating direction.

* * * * *